US010503808B2

(12) United States Patent
Vasiltschenko et al.

(10) Patent No.: US 10,503,808 B2
(45) Date of Patent: Dec. 10, 2019

(54) TIME USER INTERFACE WITH INTELLIGENT TEXT REDUCTION

(71) Applicant: SAP SE, Walldorf (DE)

(72) Inventors: Michail Vasiltschenko, Schriesheim (DE); Ralph Debusmann, Ludwigsburg (DE); Florian Hoffmann, Oftersheim (DE); Iuliia Konstantinova, Mannheim (DE); Christian Lieske, Malsch (DE); Charles Monte, San Rafael, CA (US)

(73) Assignee: SAP SE, Walldorf (DE)

( * ) Notice: Subject to any disclaimer, the term of this patent is extended or adjusted under 35 U.S.C. 154(b) by 463 days.

(21) Appl. No.: 15/211,920

(22) Filed: Jul. 15, 2016

(65) Prior Publication Data

US 2018/0018303 A1 Jan. 18, 2018

(51) Int. Cl.
*G06F 17/21* (2006.01)
*G06F 3/0484* (2013.01)
*G06F 3/0482* (2013.01)
*G06F 17/28* (2006.01)
*G06F 17/27* (2006.01)

(52) U.S. Cl.
CPC .......... *G06F 17/212* (2013.01); *G06F 3/0482* (2013.01); *G06F 3/04847* (2013.01); *G06F 17/273* (2013.01); *G06F 17/289* (2013.01); *G06F 17/2836* (2013.01)

(58) Field of Classification Search
CPC .... G06F 17/212; G06F 17/273; G06F 17/289; G06F 3/0482; G06F 3/04847; G06F 17/274; G06F 17/2755; G06F 17/2836
See application file for complete search history.

(56) References Cited

U.S. PATENT DOCUMENTS 6,279,018 B1    8/2001   Kudrolli et al.
6,289,304 B1    9/2001   Grefenstette
(Continued)

FOREIGN PATENT DOCUMENTS

WO    2009001338 A2    12/2008

OTHER PUBLICATIONS

Mark Stanger, Prevent Redundant Approval Requests in ServiceNow, published 2013, pp. 1-5. (Year: 2013).*

(Continued)

*Primary Examiner* — Tan H Tran
(74) *Attorney, Agent, or Firm* — Fountainhead Law Group P.C.

(57) ABSTRACT

Disclosed is an improved system for performing intelligent text reduction on text strings for optimal display in a variety of user interface display elements. The system includes a smart text reduction algorithm that can shorten text strings as necessary in response to resizing the user interface or elements therein. The system also includes a design time user interface for application developers (or other users) to design graphical user interfaces in a collaborative workspace. The design time user interface incorporates the smart text reduction algorithm to enable designers to modify user interface display elements and run the text reduction algorithm on any text strings that no longer fit within the modified display elements. The described embodiments can also translate text strings of user interface display elements and can execute the smart text shortening algorithm on the translated text strings accordingly.

20 Claims, 28 Drawing Sheets

(56) References Cited

U.S. PATENT DOCUMENTS

| | | |
|---|---|---|
| 6,452,597 B1 | 9/2002 | Goldberg et al. |
| 6,470,306 B1 | 10/2002 | Pringle et al. |
| 7,030,863 B2 | 4/2006 | Longe et al. |
| 7,200,559 B2 | 4/2007 | Wang |
| 7,369,984 B2 | 5/2008 | Fairweather |
| 7,398,203 B2 | 7/2008 | Corston-Oliver et al. |
| 7,685,083 B2 | 3/2010 | Fairweather |
| 7,920,132 B2 | 4/2011 | Longe et al. |
| 8,225,201 B2 | 7/2012 | Michael |
| 8,290,312 B2 | 10/2012 | Ohguro |
| 8,441,454 B2 | 5/2013 | Longe et al. |
| 8,570,292 B2 | 10/2013 | Longe et al. |
| 8,775,526 B2 | 7/2014 | Lorch et al. |
| 8,935,147 B2 | 1/2015 | Stern et al. |
| 9,400,782 B2 | 7/2016 | Longe et al. |
| 2002/0087985 A1 | 7/2002 | Kamen et al. |
| 2002/0133523 A1 | 9/2002 | Ambler et al. |
| 2003/0046527 A1 | 3/2003 | Musuchenborn |
| 2003/0171911 A1* | 9/2003 | Fairweather ............ G06F 8/427 704/2 |
| 2005/0169527 A1 | 8/2005 | Longe et al. |
| 2005/0283726 A1* | 12/2005 | Lunati .................. G06F 17/273 715/257 |
| 2006/0184351 A1 | 8/2006 | Corston-Oliver et al. |
| 2006/0274051 A1 | 12/2006 | Longe et al. |
| 2007/0112714 A1 | 5/2007 | Fairweather |
| 2008/0059877 A1 | 3/2008 | Brookler et al. |
| 2009/0284471 A1 | 11/2009 | Longe et al. |
| 2010/0179991 A1 | 7/2010 | Lorch et al. |
| 2010/0257478 A1 | 10/2010 | Longe et al. |
| 2011/0179073 A1 | 7/2011 | Nilsson |
| 2011/0234524 A1 | 9/2011 | Longe et al. |
| 2013/0262080 A1 | 10/2013 | Marciano et al. |
| 2014/0006004 A1 | 1/2014 | Gundepuneni et al. |
| 2014/0028684 A1* | 1/2014 | Maison .................. G06T 11/60 345/467 |
| 2014/0052437 A1 | 2/2014 | Longe et al. |
| 2014/0325000 A1 | 10/2014 | Lorch et al. |
| 2014/0365880 A1* | 12/2014 | Bellegarda .......... G06F 17/2785 715/261 |
| 2015/0160931 A1* | 6/2015 | Glazer .................. G06F 9/452 717/109 |
| 2015/0303941 A1 | 10/2015 | Hayes |

OTHER PUBLICATIONS

Usman Javaid, Find Length of Characters in Excel 2010, published 2010, pp. 1-5. (Year: 2010).*

Simon corston-Oliver, Microsoft Research, "Text compaction for Display on Very Small Screens," available from http://microsoft.com. 2001.

David Kirk Evans, "Identifying Similarity in Text: Multil-Lingual Analysis for Summarization," submitted in partial fulfillment of the requirements for the degree of Doctor of Philosophy in the Graduate School of Arts and Sciences, Columbia University, 2005.

Yeongkil Song and Harksoo Kim, research article "Lightweight word Spacing Model Based on short text Messages for Social Networking in Smart Homes," International Journal of Distributed Sensor Networks, vol. 2014 (2014).

Article entitled "Truncating Long Text Labels—Best Practices?" retrieved from Spunkypixels, at http://ux.stackexchange.com/questions/28109/truncating-long-text-labels-best-practices. retrieved and printed on Apr. 13, 2016.

Internet article entitled "Globalization Step-by-Step," retrieved from https://msdn.microsoft.com/en-in/goglobal/bb688140.aspx, printed on Oct. 5, 2015.

Internet article entitled "Internationalizing the User Interface," retrieved from hhttps://developer.apple.com/library/ios/documentation/MacOSX/Conceptual/BPInternational/InternationalizingYourUserInterface/InternationalizingYourUserInterface.html Published Sep. 9, 2009.

U.S. Appl. No. 15/010,291, filed Jan. 29, 2016, entitled "Translation-Based Visual Design," by inventors Florian Hoffmann, Michail Vasiltschenko, Jochen Geib and Benjamin Schork—Not yet published and not presented herewith.

* cited by examiner

FIG. 1B

EXAMPLE FORM 100  103

Maintenance Processing Status:
Transportation Document Item:
Distribution Channel Name:
Purchasing Document Item:
Responsible Service Organization:

EXAMPLE FORM 100 (With Conventional Text Truncation)

Maintenance Processing...:
Transportation Document...:
Distribution Channel Name:
Purchasing Document Item:
Responsible Service Organi...:

FORM 100 (Example First Level of Text Shortening)

Maint. Processing Status:
Transportation Doc. Item:
Distribution Channel Name:
Purchasing Document Item:
Resp. Service Organization:

FIG. 1E

FORM 100 (Example Second Level of Text Shortening)

Maint. Processing Status:
Transportation Doc. Item:
Distribution Channel Name:
Purch. Document Item:
Resp. Service Organization:

FIG. 1F

FORM 100 (Example Third Level of Text Shortening)

Maint. Process. Status:

Transport. Doc. Item:

Distr. Channel Name:

Purch. Document Item:

Resp. Serv. Organization:

FIG. 1G

FORM 100 (Example Fourth Level of Text Shortening)

Maint. Process. S...:

Transport. Doc. Item:

Distr. Chan. Name:

Purch. Doc. Item:

Resp. Serv. Orga...:

Example Responsive/Adaptive Without Text Shortening

FORM 100

102

Maintenance Processing Status:

Transportation Document Item:

Distribution Channel Name:

Purchasing Document Item:

Responsible Service Organization:

FIG. 1H

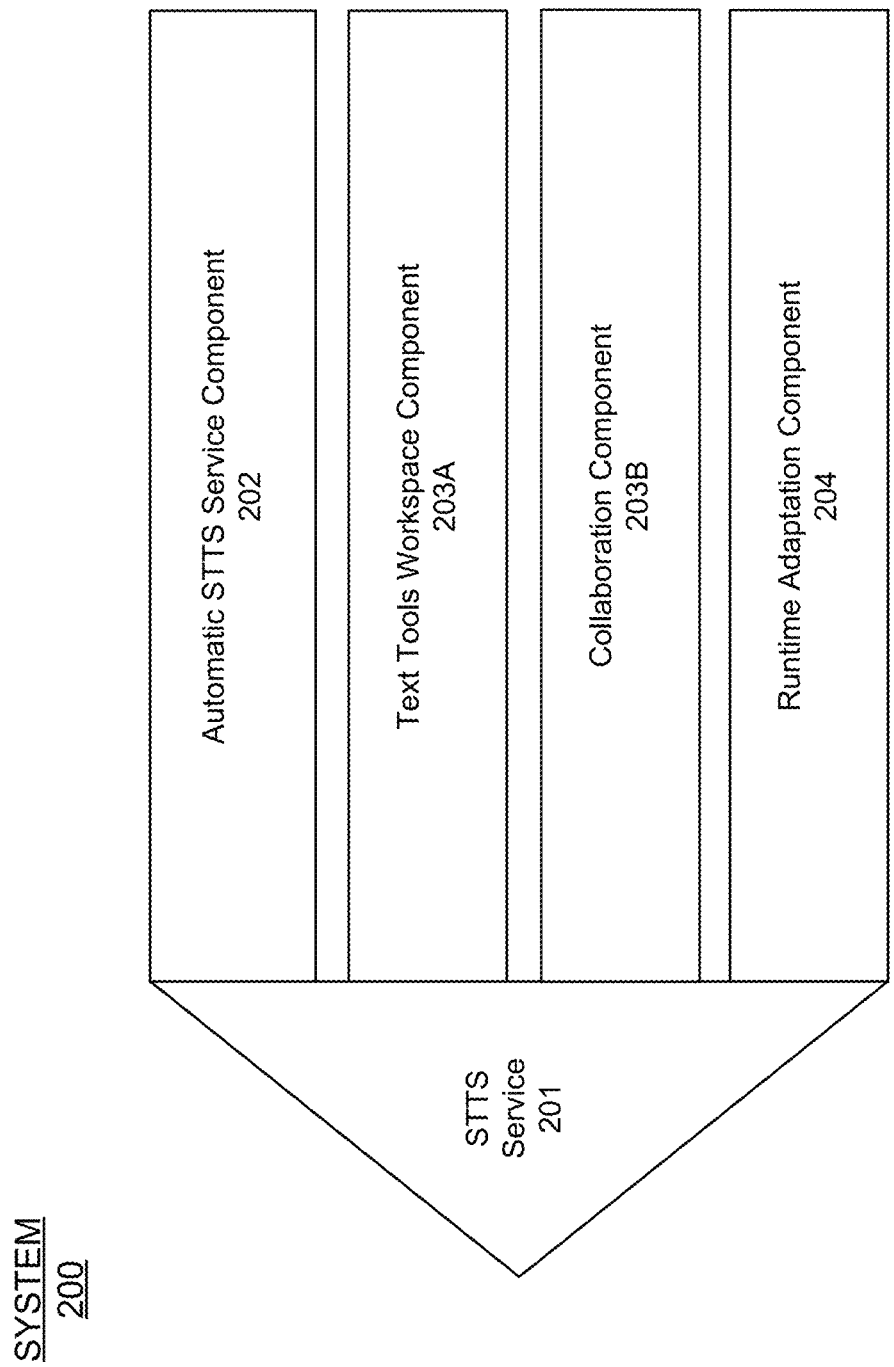

DESIGN TIME USER INTERFACE 700

Project 711

712  714  716

Workspace  Collaboration  Approvals

723

Arial  10  B  I  U

706

Total Status  Reject

Button, Footer
12 Character Limit
Responsive Control
English

722

Save Project | Text Length | Pre-Analysis | Cancel

Languages

720

Containers/Controls 702

Floating Text 704 — 350 Chars.
Lorem ipsum dolor sit amet, consectetuer adipiscing elit. Aenean commodo ligula eget dolor. Aenean massa. Cum sociis natoque penatibus Button, Footer 706 — 14 Chars.
Approve  Reject Dialog, Quick Entry 708 — 27 Chars.

Simple Form 710 — 40 Chars. per line

FIG. 7F

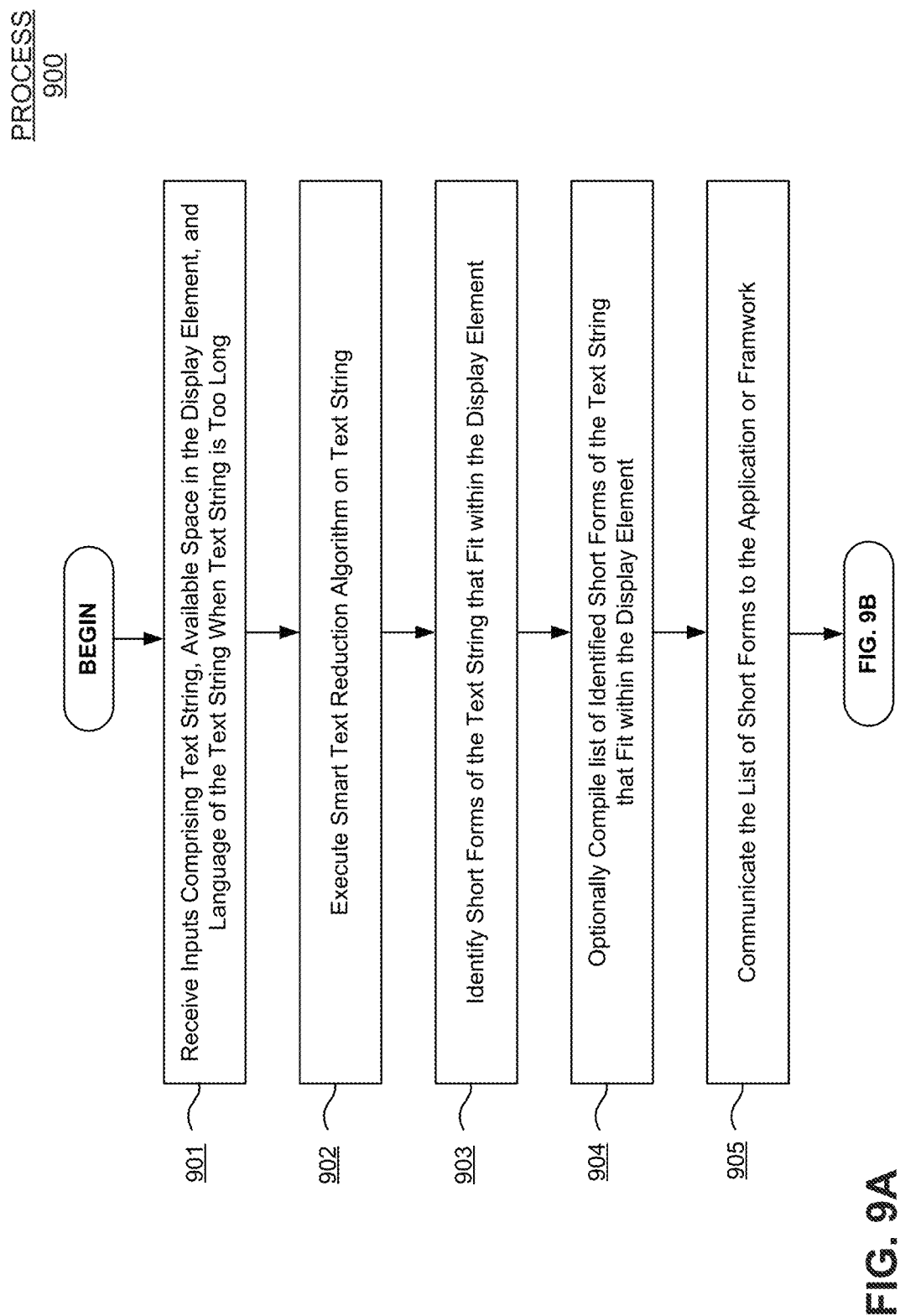

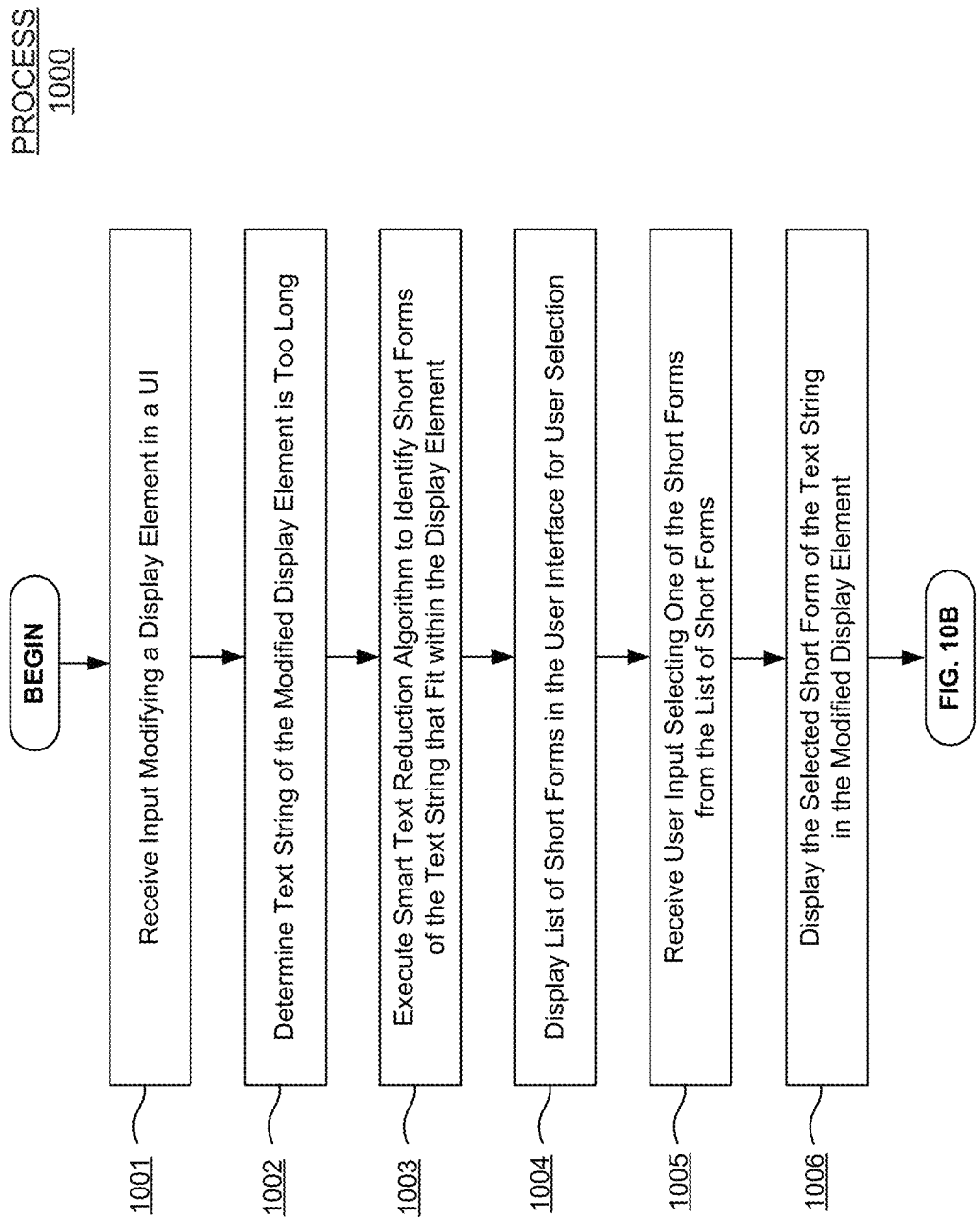

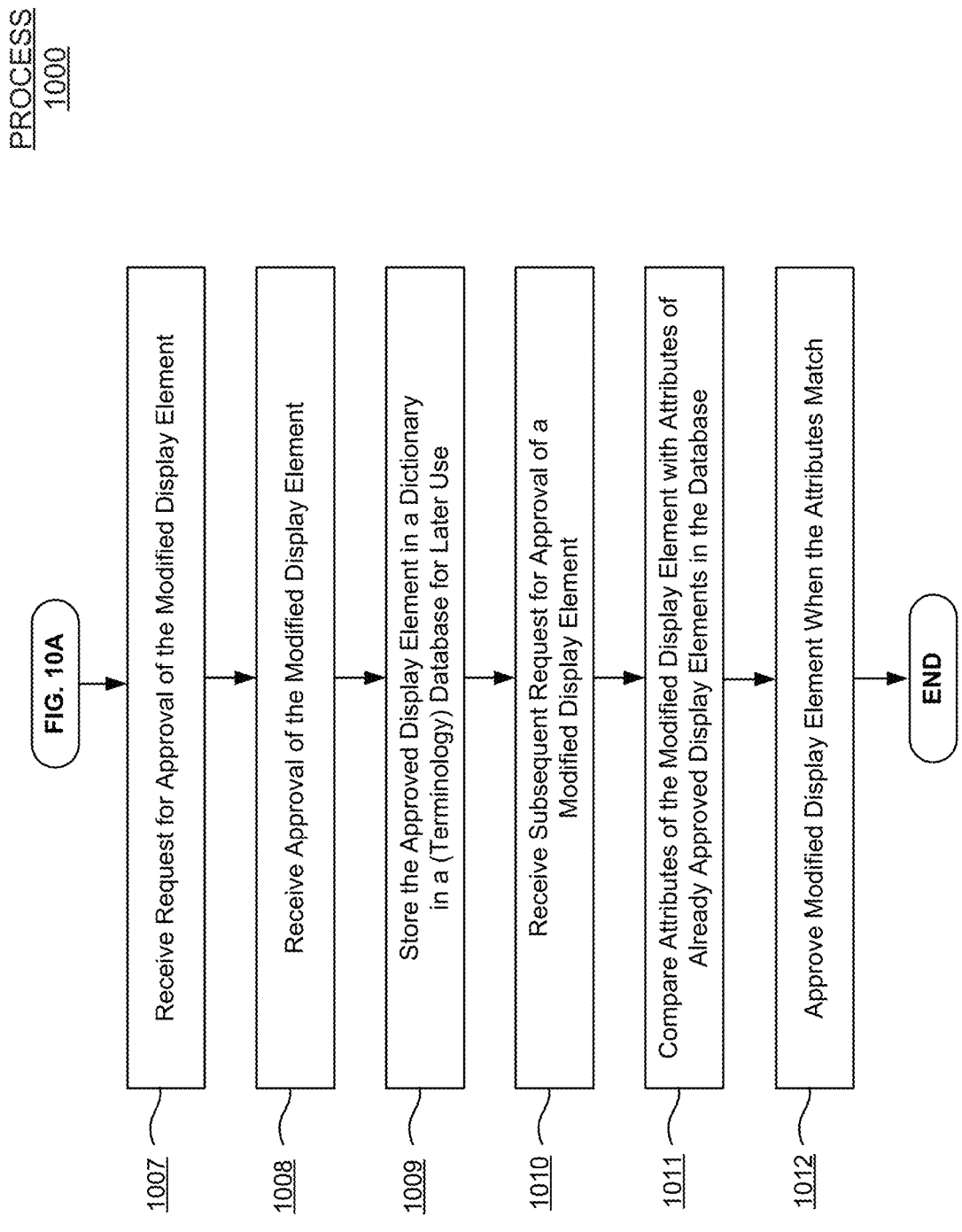

TIME USER INTERFACE WITH INTELLIGENT TEXT REDUCTION

TECHNICAL FIELD

At least certain of the described embodiments relate generally to improving displays of text strings in display elements in a graphical display screen, and particularly to a system for shortening text strings to fit within display elements of display screens.

BACKGROUND

With the expansion of the information age, people are adopting new and improved technologies at a rapid pace. Many of these technologies involve various electronic devices having user interfaces or graphical displays. Such displays are rendered on all types of electronic devices from big screen televisions to very small screens for wearable computing devices such as smart watches. The display screen size and/or screen resolution of these devices differs significantly from device to device. In addition, many displays present display elements that can be resized by users. For example, display windows may be resized by users.

This ubiquity of devices with different display screen sizes and/or screen resolutions has resulted in significant challenges relating to presenting display elements that are compatible with a variety of devices and/or device sizes. Displaying screen elements that are compatible with multiple different screen sizes and/or resolutions, or in resizable display elements can adversely impact user experience/usability. When a display area is reduced, whether by user resizing or by moving from a larger to a smaller display screen size and/or resolution, the text within the display elements (e.g., button, tab, or icon) may no longer fit within the display. As a result, text strings within the display elements need to be adapted to fit the smaller display area.

To solve this problem, existing technologies are configured to shorten the text strings arbitrarily and/or truncate the text strings. For text string truncation, ellipses are typically added in the middle or at the end of the truncated text to indicate the text has been truncated. But this can and often does make the resulting text incomprehensible, unintuitive, and sometimes even unusable or unsafe for users. In addition, such text reduction difficulties can often occur in translations of text from one language to another. Conventional computer-assisted translations are often obligated to find words that not only optimally translate the source text to the target language, but also fit within the available space of the display elements in which they are presented. This can result in clipped text, non-optimal translations, unintelligible abbreviations, and/or even untranslated or garbled text strings in translated display elements that look bad or even ridiculous in other languages.

For example, the German text string "Gesamtstatus." meaning "overall status," may be shortened to "Gemsamt . . ." ("Overall") using truncation. "Gemsamt . . ." does not help with user comprehension of the truncated term or phrase. A much better modification that would require the same amount of space in the display element would be to use abbreviations such as "G.Status" or "Ges.Status".

SUMMARY

The embodiments described in this disclosure are directed to systems, methods, and computer readable media adapted for intelligently shortening text strings in display elements of a graphical display. When the available space in a display element in a graphical display is too restricted to fit the a text string completely, the described embodiments can perform an intelligent shortening of the text string to obtain one or more short forms of the text string that fit within the available area of the display element. In this manner, certain embodiments are advantageous to render text strings within display elements of graphical displays and user interfaces in a way that is more comprehensible to users.

In order to accomplish this, at least certain embodiments can be used at runtime and take as inputs (1) the text string to be rendered in the display element of the graphical display if space permits, (2) the language of the text string, and (3) the amount of space available for the text string to fit within the display element or screen area. These embodiments can then execute an intelligent text reduction algorithm on the text string to identify one or more short forms of the text string that fit within the display element of the graphical display. This solution can provide understandable and user-friendly short forms of the text string in the display element or display screen area of the graphical display/user interface for many different types of display screens sizes and/or resolutions.

In addition, the text reduction algorithm(s) can be used at design time to enable developers (or other users) to design graphical elements of a graphical display or user interface. In this embodiment, a semi-automatic collaboration process can be used to execute one or more text reduction algorithms during design time to provide developers or designers with a list of shortened text strings that can be rendered in display elements of a particular graphical display or user interface design. In addition, the intelligent text translation and shortening process can be configured to execute text reduction algorithms on translations of text strings to different languages for display in the display elements of the graphical display or user interface design. Other embodiments may relate to a collaboration process for communicating between users of the system. The collaboration process includes, for example, submitting shortened and translated text within display elements for review and approval.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIGS. 1B-1I depict example diagrams illustrating various levels of smart text shortening as the display area gets incrementally smaller.

FIG. 2 depicts a conceptual overview block diagram showing the main features of an example embodiment of a smart text translation and shortening (STTS) service.

FIGS. 7A-7H depict example embodiments of a workspace in a design time user interface of an intelligent text reduction system and a process for using the same.

FIGS. 9A-9B depict flow charts of an example embodiment of a process for intelligently shortening text strings in a display element of a user interface.

FIGS. 10A-10B depict flow charts of an example embodiment of a process for intelligent text reduction in a design time user interface with user collaboration functionality.

DETAILED DESCRIPTION

Throughout the description, for the purposes of explanation, numerous specific details are set forth in order to provide a thorough understanding of the present disclosure. It will be apparent to one skilled in the art, however, that the techniques described in this disclosure may be practiced without some of these specific details. In other instances, well-known structures and devices may be shown in block diagram form to avoid obscuring the novel principles and techniques described in this disclosure.

Figure 1A:
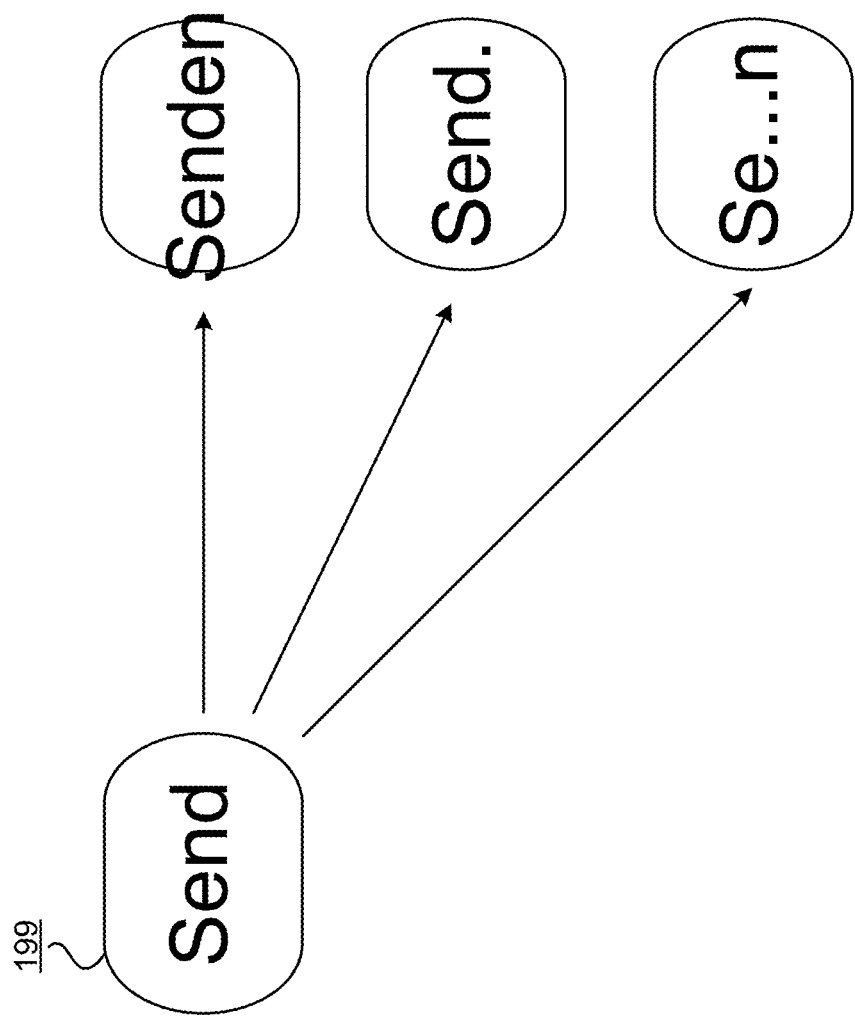
FIG. 1A depicts some examples of the problem with resizing display elements in an example graphical interface using conventional methods.

FIG. 1A depicts some examples of the problem with resizing display elements in a graphical interface using conventional methods. The button display element 199 in the display has been provided with exactly the minimum required size (e.g., width and height) to accommodate the word "Send" in English. But the button element 199 is too small to accommodate the German translation "Senden", and therefore, abbreviation such as "Send." or "Se . . . n" are used instead. As can be seen, this results in a less than optimal look for the display element in German. The embodiments described in this disclosure include systems, methods, and computer readable media adapted for solving this and similar problems in an intelligent way.

In at least certain embodiments, the described techniques are adapted for intelligently reducing text strings in display elements of a user interface. These intelligent text reduction techniques are based on executing one or more intelligent text reduction algorithms on the text strings. The intelligent text reduction algorithms can be utilized during runtime when display elements in a user interface are resized to a smaller size, or at design time when the graphical display or interface is being designed. The display elements of the display may be downsized, for example, as a consequence of a user switching to a different computing device or display screen and/or a different screen resolution, or as a consequence of a user is resizing a display window or other display elements in the display. It should be noted that "users" of the system described in this disclosure may include end users of an application at runtime, as well as developers and designers of graphical displays and/or interfaces using the design time user interface.

In one embodiment, text reduction can be accomplished by combining linguistic analysis of the input text string(s) with information regarding the space available within the corresponding display element of the user interface. A list of possible short forms of the text string can be determined for rendering the text string to fit within the available space in the display element. This can be done intelligently, for example, to output short form(s) of the text string that preserve the more important semantic aspects of the original text string, thus allowing the text string to be rendered in the display element in a manner that is comprehensible for users.

FIGS. 1B-1I depict example diagrams illustrating various levels of smart text shortening as the display area gets incrementally smaller. FIG. 1B depicts an example display of a form 100 having a plurality of data entry fields 102 and corresponding text 103. FIG. 1C depicts example form 100 with conventional text truncation when the display area is reduced from its original size. As the display area gets smaller, the text 103 becomes more and more incomprehensible. With smart text reduction as described in this disclosure, this problem is mitigated, or in some cases eliminated entirely.

FIG. 1D depicts an example of a first level of text shortening as the display size of form 100 is reduced from its original size. As can be seen, instead of just truncating the text at the end as in conventional solutions, the embodiments of the smart text shortening algorithm are configured to shorten the text in an intelligent way that is comprehensible to users. In the example of FIG. 1D, the text "Maintenance" has been shortened intelligently to "Maint.," the text "document" has been intelligently shortened to "Doc.," and the text "Responsible" has been intelligently shortened to "Resp." As can be seen, much of the semantic aspects of the text is maintained. Also it should be noted that the text strings in FIG. 1D are not limited to being shortened at the end of the text. In this case, text at the beginning and in the middle of the text strings are also shortened. FIGS. 1E-1G depict various examples of the intelligent text shortening according to embodiments as the display area of form 100 is reduced further (second through fourth example levels).

In addition to truncation, conventional systems may also use responsive/adaptive user interfaces such as the example shown in FIG. 1H. In such cases, the text within the display area may be relocated as shown for the fields 102 in order to accommodate the text in the display. Embodiment are configured to work in coordination/combination with responsive/adaptive user interface techniques as shown in FIG. 1I. In the figure, a responsive/adaptive user interface with text shortening is shown. Such a case may arise, for example on a smart watch screen 104 with a scrollable display area as shown. Form 100 in such a display is reduced to such an extent that the text needs to be further shortened. In this example, the responsive/adaptive mechanism has moved the text to accommodate the smaller display area, and smart text shortening is further employed to make the text shorter and yet still comprehensible to users.

I. Illustrative Systems

Provided below is a description of an example system upon which the embodiments described in this disclosure may be implemented. Although certain elements may be depicted as separate components, in some instances one or more of the components may be combined into a single device or system Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality can be performed by custom hardware components containing hardwired logic for performing operations, or by any combination of computer hardware and programmed computer components. The embodiments described in this disclosure are not limited to any specific combination of hardware circuitry or software. The disclosed embodiments can also be practiced in distributed computing environments where operations are performed by remote data processing devices or systems communicating through one or more wired or wireless networks with multiple interconnected nodes.

When display elements are resized or rendered on smaller display screens and/or smaller screen resolutions, their corresponding text strings can become incomprehensible. The conventional methodology is just to truncate the text in the display elements and add ellipses to indicate where the full text has been cut off. As a result, the display elements can become unintuitive, unusable, or even unsafe. In one embodiment, the intelligent text reduction system comprises a smart text translation and shortening service configured to address these and other challenges. At least certain of the techniques described in this disclosure employ processes from computational linguistics and heuristics from practical experience to automatically generate smart text shortenings to fit within display elements of a user interface.

FIG. 2 depicts a conceptual overview block diagram showing the main features of an example embodiment of a smart text translation and shortening (STTS) service. At the outset, it should be noted that the described embodiments of the STTS service 201 are not restricted to software user interfaces. The described embodiments may also be used for hardware displays such as in consumer electronics (e.g., washing machines) or other entities or elements in the Internet of Things ("IoT"). It should also be noted that, although the illustrated embodiment combines text reduction and text translation features, the embodiments of this disclosure are not so limited. In other embodiments, these features may be separate features performed by separate components or performed by multiple components or systems working in a functionally coordinated manner. In addition, the translation feature is optional and the disclosed embodiments are not limited to systems that require text translation as a component of the smart text shortening service.

In the illustrated embodiment, system 200 comprises an STTS service 201 having an automatic STTS service component 202, a text tools workspace component 203A, a collaboration component 203B, and a runtime adaptation component 204. In one embodiment, the automatic STTS service 202 may be the central component of STTS service 201. The automatic STTS service 202 can be implemented as a service (e.g., microservice) to be utilized at runtime by user interface frameworks or user-interface driven applications to automatically calculate a set of possible shortened text strings for display within the display elements of a user interface; or the automatic STTS service 202 can be directly integrated into a UI framework. It should be noted, that although the described embodiments include the automatic STTS service 202, the embodiments are not so limited, as the STTS service 202 can be implemented without the automatic feature.

Whenever a text string is determined to be too long to fit within a user interface display element (e.g., button, tab, column header, etc.), the automatic STTS service 202 can be called to execute a text reduction algorithm comprising one or more text reduction processes to shorten the text string in a variety of different ways. The text reduction processes performed during execution of the text reduction algorithm can be configured and customized by users based on a set of rules depending on desired results. The automatic STTS service 202 can be called by user interface-driven applications themselves, or by a UI framework. The automatic STTS service 202 can automatically calculate a set of one or more shortened text strings that fit within user interface display element. In one embodiment, the best of the possible short forms of the text string may also be calculated or selected by users from a list of short forms of a the text strings. In addition, the automatic STTS service 202 can notify the user interface application or framework when a text string cannot be further shortened or that the text cannot be made short enough to fit into the display element.

In one embodiment, inputs to the text reduction algorithm can include (1) the (non-shortened) full text string to be rendered in a display element of a graphical interface, (2) the language of the text string, and (3) the amount of space available in the display area of a UI display element. One or more adapted/shorter text string alternatives (e.g., short forms of the text string) can be determined based on executing a text reduction algorithm on the text string. A list of short forms of the text string can then be provided as output.

In one embodiment, pre-analysis can be performed on the text string before executing the text reduction algorithm. For example, a term dictionary can be consulted (e.g., from a database) to find suitable acronyms and/or abbreviations for the text string or portions thereof. Spelling and grammar checks can also be performed during the pre-analysis step to insure the text strings are correct before the STTS 201 service attempts to shorten them.

Other rules and procedures may be applied to the text string as part of the pre-analysis phase or as one of the text reductions processes called during execution of the text reduction algorithm on the text string. For example, a rule may be applied that limits use of abbreviations as much as possible to avoid unnecessary abbreviations appearing in a display area when it is determined that sufficient space is available to include the full text. As another example, a rule may be applied requiring that abbreviation be performed by dropping full words in a noun string instead of abbreviating each individual noun. Another rule could be applied that requires names to be displayed in full text where space allows and not to truncate or abbreviate the names unless space is restricted. Any number of different user-customizable rules can be applied at the pre-analysis or text reduction phases of the process.

After the pre-analysis is performed on the text string, the text reduction algorithm can be executed on the text string to determine one or more short forms of the text string for display in the UI display element. As an alternative to the simplistic text reduction techniques of conventional solutions, including for example truncating text strings and adding ellipses, the described embodiments can be adapted to provide an intelligent solution that often does not require additional characters or space; and that also maintains more important semantic aspects of the text string. In short, the smart text reduction techniques of the present disclosure fills the gap between resizing display elements and presenting the text strings of those display elements in a comprehensible way and in a manner that eliminates arbitrary truncation of text strings in display elements of a user interface. The output of executing the text reduction algorithm(s) can provide one or more short forms of the text string that preserve the more important semantic aspects of the text, thus facilitating display of text strings in a manner that is comprehensible to users.

The embodiments can be adapted for intelligently shortening text strings of UI display elements, and in certain embodiments, presenting a list of short forms of the text string for user selection. In one embodiment, after the pre-analysis of the text string is complete, a set of one or more text reduction processes can be performed on the text string. These text reduction processes can include morphological analyzers, parts of speech ("PoS") taggers and/or shallow parsing techniques that can be run on the text string to identify semantic "heads" of the text string and associated semantic "dependents". As a rule of thumb, a good result can often be achieved where the semantic heads are preserved and their dependents are either shortened or left out entirely.

Using the example from above, morphological analysis can be used to split compound words such as "Gesamtstatus" ("overall status") into the more important semantic head "status" and the less important semantic dependent "gesamt" ("overall"). Keeping the more important semantic head intact, while abbreviating the less important semantic dependent can yield the following example short forms: "G.Status" or "Ges.Status". As another example, PoS tagging can be used on the Russian phrase "Запланированный Запуск" ("Planned Start") to identify the noun "Запуск" ("Start") as the semantic head, and to identify the participle "Запланированный" ("planned") as the semantic dependent. By preserving the semantic head and shortening the semantic dependent, the text reduction processes described in this disclosure can be adapted to arrive at smart text reductions of this phrase such as "Запл . Запуск" for example.

In FIG. 2, the text tools workspace 203A and collaboration component 203B can be utilized at design time when a developer (or other user) is designing a user interface. This embodiment can be adapted to assist designers or developers in arriving at the best of the possible shortened UI text strings using a semi-automatic collaboration process. In an embodiment the collaboration component 203B may provide communication between designers, developers and others that are responsible for approving or rejecting shortened text strings in display elements and/or screen areas. In one example embodiment, the text tools workspace component 203A may incorporate grammar, spelling, text reduction, and smart dictionary/thesaurus functionality, and allow users to choose from a list of possible short forms of the text strings for each UI element output from executing the text reduction algorithm. The text tools workspace and collaboration process are discussed in more detail below with reference to FIGS. 7A-7H and 8A-8C.

The runtime adaptation component 204 of the STTS service 201 can be utilized with existing UI runtime functionality to include knowledge about text reduction. In one embodiment, the runtime adaptation component 204 may automatically apply shortened UI Text strings from the automatic STTS service component 202 to an already existing user interface at run-time.

Figure 3:
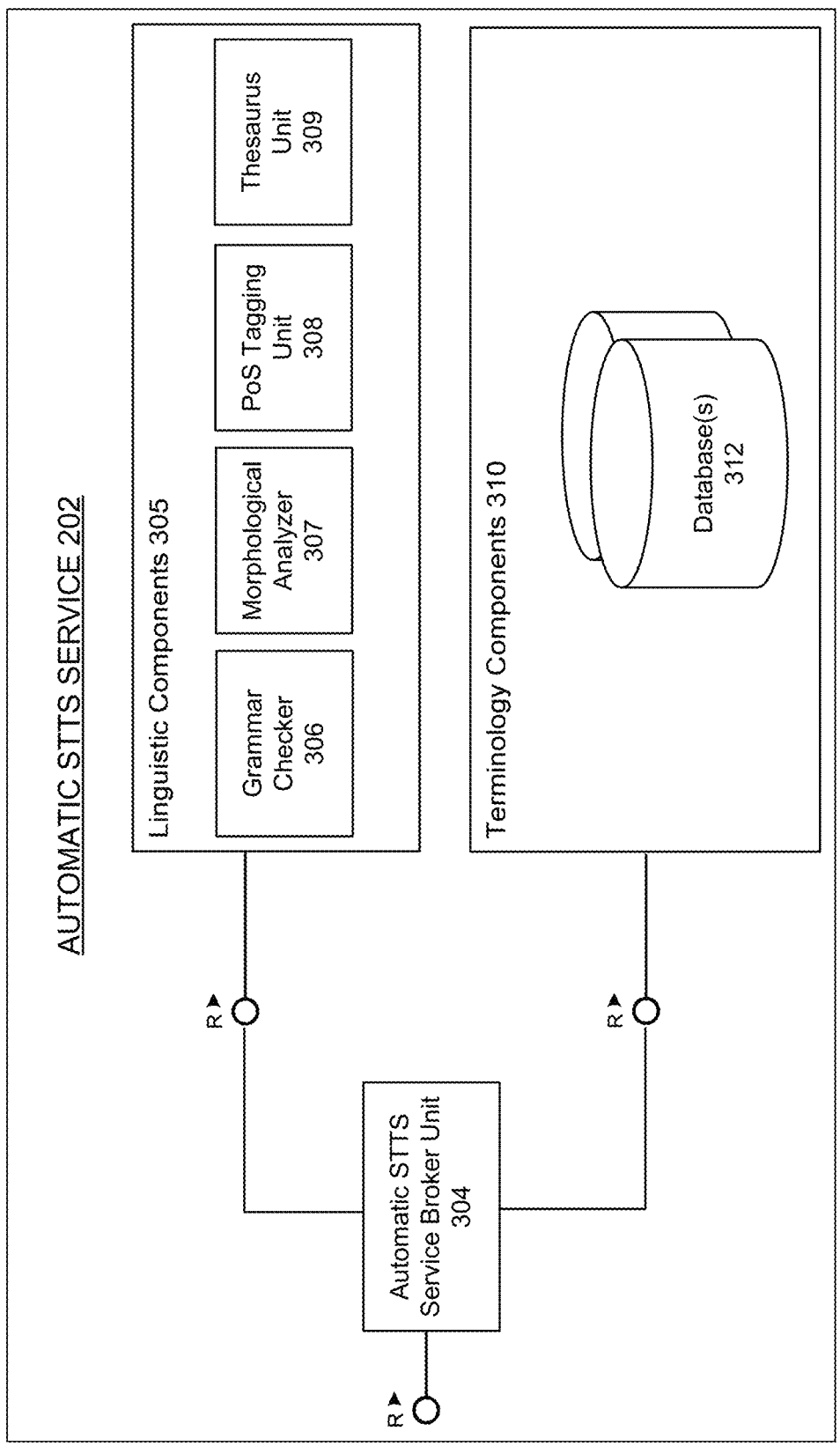
FIG. 3 depicts a conceptual block diagram of an example embodiment of an automatic smart text translation and shortening (STTS) service.

FIG. 3 depicts a conceptual block diagram of an example embodiment of an automatic smart text translation and shortening (STTS) service. In the illustrated embodiment, automatic STTS service 202 comprises an automatic STTS service broker unit 304, linguistic components 305, and terminology components 310. The linguistic components 305 include a grammar checker 306, a morphological analyzer 307, and a parts-of-speech ("PoS") tagger unit 308, a thesaurus unit 309, and the terminology components 310 include one or more databases 312. In certain embodiments, a terminology dictionary and/or thesaurus may be stored and accessed from the databases 312.

The automatic STTS service broker 304 can be called from the UI application or framework making use of the automatic STTS service 202 and can be used to communicate requests to access the linguistic components 305 and the terminology components 310 of the automatic STTS service 202 as needed to perform one or more of the text reduction processes and quality measurements in accordance with the described embodiments.

Figure 4:
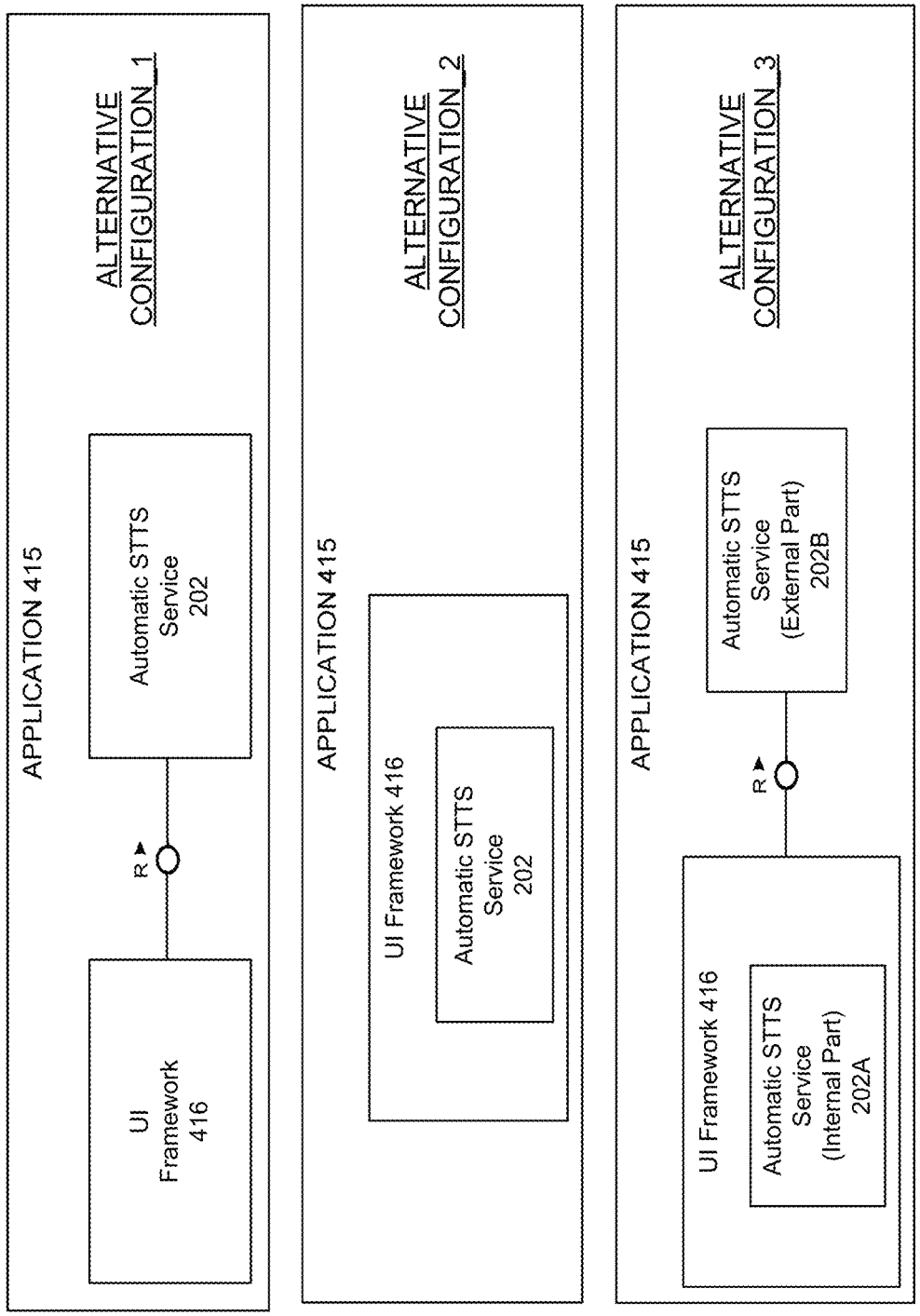
FIG. 4 depicts conceptual block diagrams of example alternative implementations of the automatic smart text translation and shortening service.

FIG. 4 depicts conceptual block diagrams of example alternative implementations of the automatic smart text translation and shortening service. In this embodiment, there are three main alternative implementations of the automatic STTS service 202: as a web service, a runtime component of the UI framework 416, or as a combination of a web service and a runtime component of the UI framework 416. Alternative configuration_1 depicts the implementation of the automatic STTS service 202 as a web service (e.g., a RESTful Web Service). "RESTful" web services are well known in the art—a service based on REST (Representational State Transfer) is called a RESTful service. REST is an architectural style that specifies constraints, such as a uniform interface, that if applied to a web service, can induce desirable properties (e.g., performance, scalability, and modifiability) that enable services to work best on the Web. In the REST architectural style, data and functionality can be considered resources and accessed using uniform resource identifiers ("URIs"), which are typically links on the Web. The resources can be acted upon using a set of simple, well-defined operations. The REST architectural style can constrain an architecture to a client/server architecture and can be designed to use a stateless communication protocol, typically hypertext transfer protocol ("HTTP"). In the REST architecture style, clients and servers can exchange representations of resources by using a standardized interface and protocol. It should be noted, however, that the described embodiments are not limited to any particular type of web service or communication protocol.

In alternative configuration_1, the application 415 includes a UI framework 416 that performs calls to the automatic STTS service 202 via a web service. In this implementation, the web service does the work: first, a linguistic pre-analysis can be performed on text strings that are too long to fit within a UI display element, followed by executing a text reduction algorithm on the text strings to calculate one or more short forms that are of suitable size (e.g., length and/or height) to fit within the UI display element.

Although alternative configuration_1 can be a more flexible option, it may perform more slowly than other configurations because the UI framework 416 may potentially have to call the automatic STTS web service 202 every time a display element in a display area (e.g., display screen, window, or tile) is downsized.

Alternative configuration_2 depicts the implementation of the automatic STTS service 202 as a runtime component of the UI framework 416. In this example, both linguistic pre-analysis and text reduction algorithm calculations can be performed at runtime as a part of the UI framework 416. This may be the best option from a performance perspective where the UI has direct access to the automatic STTS service 202, but can be less modular than the web service embodiment of alternative configuration_1. In addition, the runtime component can become very complex and require significant device area for implementation as part of a UI framework 416.

Alternative configuration_3 depicts the implementation of the automatic STTS service 202 as a combination web service and runtime component. In the illustrated embodiment, application 415 includes a UI framework 416 comprising an internal part of the automatic STTS service that is implemented as a runtime component 202A of the UI framework 416, and an external part that is implemented as a web service 202B in communication with the UI framework 416. In one embodiment, the web service 202B may be used for the linguistic pre-analysis phase of the process and the text reduction algorithm may be executed by the runtime component 202A. This option may be the most practical because the web service 202B only needs to be called to establish the linguistic pre-analysis, which can then be re-used over and over again upon each resizing event in the user interface. The runtime component 202A can be used to repeatedly recalculate the text reduction algorithm for text strings as needed within the UI framework 416.

Figure 5:
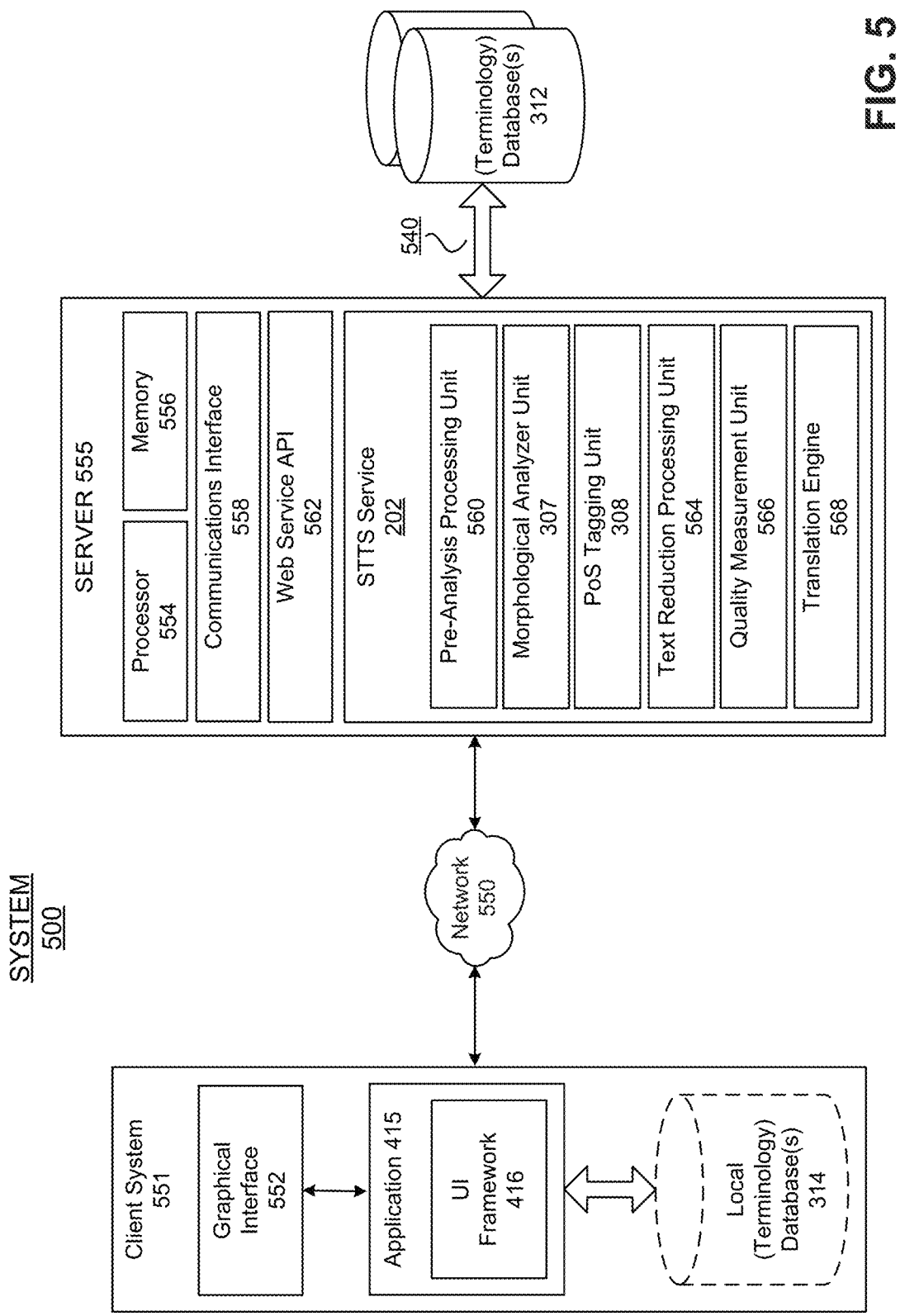
FIG. 5 depicts a conceptual block diagram of an example embodiment of a system for implementing a smart text translation and shortening service.

FIG. 5 depicts a conceptual block diagram of an example embodiment of a system for implementing a smart text translation and shortening service. In the illustrated embodiment, system 500 includes a client system 551 in communication with a server computer 555 over one or more networks 550. The client system includes a graphical display 552, an application 415, a UI framework 416, and one or more optional local terminology databases 314. The server 555 includes a processor 554, a memory 556, a communications interface 558, a STTS service 202, and web service application programming interface ("API") for the STTS service 202. In one embodiment, the server 555 may comprise an individual computing server or node, and in other embodiments, server 55 may comprise a set of servers or other computing devices working together in a functionally coordinated manner.

In this embodiment, the STTS service 202 is configured as a web service using web service API 562 in the manner described for alternative configuration_1 in FIG. 4 above. As discussed previously, the STTS service 202 can also be configured as a runtime component of the UI framework 416, or as a combination of web service and runtime component. For the runtime component embodiment of the STTS service, the local terminology database(s) 314 may be optionally provided to enable local access by the application 415 and/or UI framework 416 during runtime.

The depicted embodiment of the STTS service 202 comprises multiple processes that can be performed to intelligently shorten text strings in a user interface, such as graphical interface 552 of client system 551. There are multiple ways to shorten text. Embodiments of the smart text reduction algorithm may utilize some or all of the text reduction processes described in this disclosure to produce a variety of short forms of the text that it can then choose the best ones from. APPENDIX A has been included at the end of this disclosure to provide an example of a pseudo-code implementation of a smart text reduction process.

The STTS service 202 comprises a number of text reduction processes that can be performed on input text strings. In the illustrated embodiment, the STTS service 202 comprises a grammar checker 307, a morphological analyzer unit 306, a PoS tagging unit 308, a thesaurus unit 309, a text reduction processing unit 564, a quality measurement unit 566, and a translation engine 568. In operation, application 415 and/or UI framework 416 of the client system can be configured to determine when display elements in graphical interface 552 are downsized to such an extent that one or more text strings in the UI display elements are too large to fit within the corresponding downsized UI display elements. In response to this determination, the application 415 and/or UI framework 416 can communicate inputs for text reduction processing to the STTS service 202 at server 555 over the network(s) 550 via the communications interface 558 and web service API 562.

In one embodiment, the inputs for smart text reduction processing may include the text string(s) that are too long to fit within their corresponding UI display elements, the language of the text string(s), and the amount of available space within the display area of the corresponding UI display elements. The STTS service 202 can receive these inputs from the client system application 415 and/or UI framework 416 and execute a smart text reduction algorithm to perform one or more text reduction processes on the inputs, and output one or more short forms of the text string(s) that fit within their corresponding UI display elements or screen area. The short forms of the text string(s) can then be communicated back to the application 415 and/or UI framework 416 at the client system 551 for display in graphical interface 552.

During processing of text stings using the intelligent text shortening techniques described in this disclosure, one or more databases 312 and/or 314 (e.g., terminology databases) can be accessed to retrieve information for execution of the text reduction processes on the input text strings. For example, terminology dictionaries and/or thesauruses can be accessed from the databases 312/314 and used in various calculations to identify a set of short forms for the input text strings. In one embodiment, the best short form of the set of short forms can also be identified or presented to a user for selection.

In the depicted embodiment of FIG. 5, the STTS service 202 includes pre-analysis processing unit 560 that may be configured to perform grammar, spelling, or other related checks to correct any errors in the input text string(s) before the text reduction processes are performed. Spelling and grammar errors in an input text string can lead to unpredictable or erroneous results. As discussed, other pre-analysis processes can be performed on the input text string and these processes can be configured and customized by users. The particular set of operations, or the order of operations, for performing pre-analysis processing or text reduction processing may vary from implementation to implementation, and can be configured by users of the STTS system based on users' requirements.

The STTS service 202 further includes a morphological analyzer unit 307 and a PoS tagging unit 308. As discussed, in one embodiment, the PoS tagging unit 308 can be configured to tag parts of speech of the input text string to identify (e.g., nouns and verbs), and the morphological analyzer unit 307 can be configured to perform morphological analysis on the tagged input text string(s) to split the text string(s) into its semantic heads and dependents.

The STTS service 202 further includes a text reduction processing unit 564. In one embodiment, the text reduction processing unit 564 can be configured to execute a smart text reduction algorithm that is operable to perform one or more text reduction processes on the input text string. The details of one embodiment of the text reduction processing unit are described below with reference to FIG. 6A.

The STTS service 202 further includes a quality measurement unit 566. In one embodiment, the quality measurement unit 556 may be configured to perform quality measurements on the short forms of the text string(s). For example, the quality measurement unit 556 can be configured to perform quality measurements on the list of short forms of the text string(s) determined in previous steps. The quality measurements may be used, for example, to compare the various different short forms of the text string(s) that were previously identified to determine a list of the best ones of the possible short forms. In one embodiment, the list may be a prioritized list. The details of one embodiment of the text reduction processing unit are described below with reference to FIG. 6B.

Finally, the STTS service 202 in the illustrated embodiment includes a translation engine 568. In one embodiment, the translation engine 568 can be used to translate text strings in UI display elements into one or more different languages. The smart text reduction techniques described in this disclosure may then be applied to the translations of the text strings as needed when any of the translated text strings are too large to fit within the display area of its UI display element.

It should be noted that the networks described in this disclosure are not limited to any particular network or network type. No specific network or network architecture should be construed as limiting the embodiments and techniques described in this disclosure. For example, the network(s) 540 and 555 may be implemented as any single wired or wireless communication medium configured for communicating electronic information, or as multiple separate networks in communication with one another. For example, networks 540 and 555 can be implemented as a local area network ("LAN"), a wide-area network ("WAN"), a combination of LANs and WANs, or any other type of communication network adapted for communicating electronic messages and information. Further, the networks 540 and 555 may be implemented as a physical array of hardware resources or as a virtual array, or any combination thereof. The networks 540 and 555 may also be implemented in a cloud-based network configuration. For example, the networks 540 and 555 may be implemented as any type of public or private cloud network, or combination thereof.

In addition, the server 555 may be implemented as an individual computer hardware server or as an array of computer hardware servers logically coupled together and working in a functionally coordinated manner. The server 555 may be configured to perform data access operations with respect to data stored in one or more repositories of data (e.g., database(s) 312). Depending on the type of server 555, the data operations may range from simple operations, such as storing and retrieving data, to more complex operations such as calculating statistics based on the data, or arranging, modifying, or formatting data.

The server 555 may access this information via one or more internal and/or external networks 540. In one embodiment, the database(s) 312 are remote from the server 555 and may be accessed by server 555 via one or more networks 540. In other embodiments, the database(s) 312 may be a component integrated with server 555 and may be accessed by server 555 via one or more communications mediums and/or internal networks 540.

In one embodiment, the database 312 may be configured as a relational database in which data can be stored in structured database tables (or other data structures) comprising of rows and columns, and accessed through data storage rules (or schemas). Other examples of database systems include database systems where data can be stored in a semi-structured or unstructured format. The data storage devices as described in this disclosure may include various databases including relational database systems, or other structured, semi-structured, or unstructured databases or data stores.

Figure 6B:
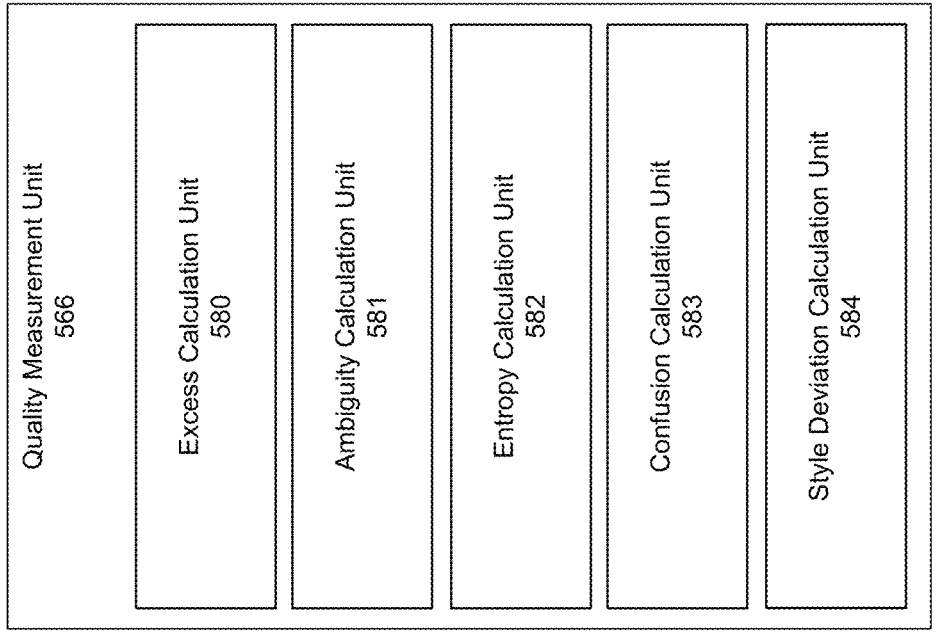
FIG. 6B depicts a conceptual block diagrams of an example embodiment of a quality measurement unit.
Figure 6A:
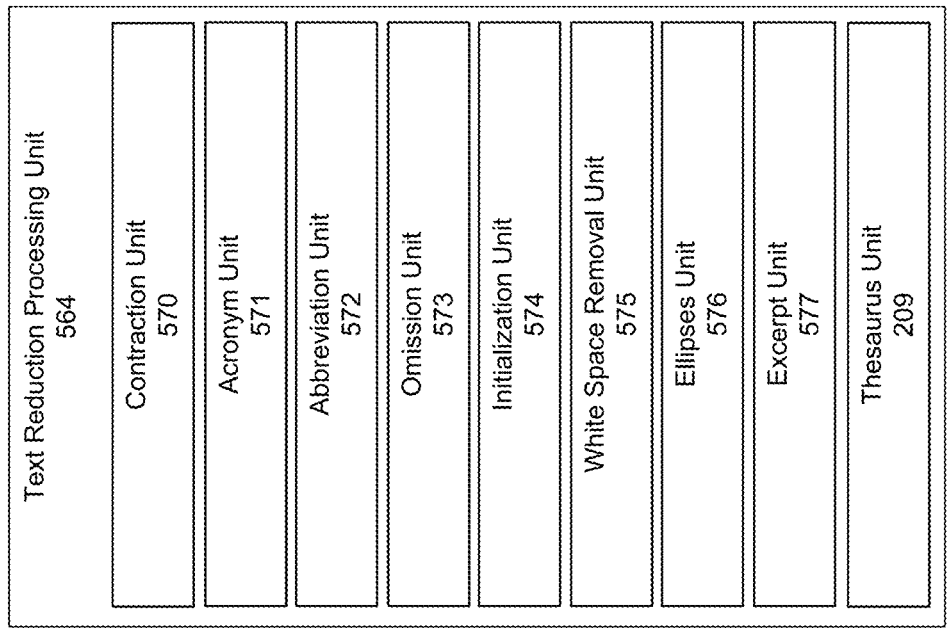
FIG. 6A depicts a conceptual block diagram of an example embodiment of a text reduction processing unit.

FIG. 6A depicts a conceptual block diagram of an example embodiment of a text reduction processing unit. In the illustrated embodiment, the text reduction processing unit 564 includes a contraction unit 570. In one embodiment, the contraction unit 570 can be configured to remove a sequence or multiple sequences of characters from the middle of a word without replacement. For example, "Dr" for "D̲octo̲r" or "Ms" for "M̲iss̲".

The text reduction processing unit 564 further includes an acronym unit 571. In one embodiment, the acronym unit 571 can be configured to access a dictionary and/or thesaurus of terms from the databases 312/314 to find suitable acronyms for one or more terms in the text string (or set of text strings).

The text reduction processing unit 564 further includes an abbreviation unit 572. In one embodiment, the abbreviation unit 572 can be configured to remove a sequence of characters at word end and put a full stop in its place. For example, "e.g." for "e̲xample g̲iven".

The text reduction processing unit 564 further includes an omission unit 573. In one embodiment, the omission unit 573 can be configured to remove a sequence of characters from the middle of a word and replace it with a tilde "~". For example "58727~43FAJ" for "58727AJ234K23443FAJ". This process can be especially effective for identifiers or strings.

The text reduction processing unit 564 further includes an initialization unit 574. In one embodiment, the initialization unit 574 can be configured to reduce all words to their first character and remove all whitespace without replacement. For example "asap" for "as soon as possible".

The text reduction processing unit 564 further includes a white space removal unit 575. In one embodiment, unit 574 may also be referred to as a "reduction" processing unit. In one embodiment, the white space removal unit 575 can be configured to remove whitespace without replacement. For example "TotalSum" for "Total Sum". The text reduction process can be used primarily for title case texts, where the inline capitals allow user recognition each word's borders. Reduction may be used in combination with another process if the other process alone is not sufficient.

The text reduction processing unit 564 further includes an ellipses unit 576. In one embodiment, the ellipses unit 576 can be configured to remove a sequence of characters at text end, possibly across multiple words, and replace with ellipsis. For example, "a long sent . . . " for "a long sentence like this". Symbolic representation of the ellipsis may vary; for example, the ellipsis may be represented as three full stops " . . . ", a special ellipsis character " . . . ", or a tilde "~", etc.

The text reduction processing unit 564 further includes an excerpt unit 577. In one embodiment, the excerpt unit 577 can be configured to remove one or more words from the middle of the text and put ellipsis in their place. For example, replace "a long sentence like this" with "a . . . like this." In at least certain embodiments, the text reduction processing unit 564 also includes a thesaurus unit 209 as discussed above.

FIG. 6B depicts a conceptual block diagrams of an example embodiment of a quality measurement unit. In the illustrated embodiment, the text quality measurement unit 566 includes an excess calculation unit 580. In one embodiment, the excess calculation unit 580 can be configured to calculate any excess of the short forms of the text string resulting from applying the one or more text reduction processes on the text string. In one embodiment, the text reduction processes may be performed on the text string in any user-configurable order as a result of executing the smart text reduction algorithm in accordance with the embodiments described in this disclosure.

Excess refers to how much shorter the short form is than the width restriction for displaying each text string in its UI display element. In one embodiment, short forms may only be made as short as necessary. Clipping too much of a text string may remove too much information from the displayed text. An example equation for calculating excess of a short form of a text string can be calculated as follows:

$$f(s, w) := \begin{cases} \frac{w - |s|}{w} & \text{if } |s| \leq w \\ 1 & \text{if } |s| > w \end{cases}$$

with f: S×R→R and f(s, w) ∈[0, 1], where "S" is the space of all strings, "s" is a short form, "w" is the width restriction of the UI display element, and "|s|" is the width of the short form "s".

For example, a width restriction of 5 characters, the short for "St." for the text string "Street" can yield a score of f (St., 5)=min (1, (5−3)/5=min (1, 2/5)=0.4 (lower numbers reflect better scores). In this case, the longer short form "Str." ranks better at 0.2 because it makes better use of the available space in the excess calculation.

As general rule, the lower the excess, the better the short form. A perfect value of "0" is possible, but unlikely; it occurs only if a short form is found that fits the width restriction exactly. In one embodiment, short forms that do not satisfy the width restriction are ranked with the lowest possible score of 1.

In the illustrated embodiment, the text quality measurement unit 566 further includes an ambiguity calculation unit 581. In one embodiment, the ambiguity calculation unit 581 can be configured to determine how ambiguous the short forms of text are within a text group. Ambiguity can be measured by assuming that the user is aware of the long forms of the texts. If a short from can be derived from only one of the long forms, the short form is unambiguous. For example, the short form "St." can be derived from the words "Street" and "Station", but not from the word "coffee". As a result, "St." is unambiguous in the text groups {Street, coffee} and {Station, coffee}, but is ambiguous in the text groups {Street, Station} and {Street, Station, coffee}.

Whether a short form can be derived from a text can be expressed with regular expressions: take the short form, add a "^" symbol at the front and a "$" at the end; and replace all replacement indicators with ".*". The resulting regular expression can be applied to a text string to find out whether the short form of the text string can be derived from it. For example, this process converts the short form "St." into "^St.*$". The operator "^" marks the beginning of the text, the operator "$" marks text end, and the operator ".*" can accept any number and combination of characters. As a result, "^St.*$" fits all words that start with "St.".

In one embodiment, ambiguity can be calculated as follows:

$$f(r, T) := \frac{[\Sigma_{t \, in \, T} g(r, t)] - 1}{|T| - 1}$$

$$g(r, t) := \begin{cases} 1 & \text{if } r \text{ fits } t \\ 0 & \text{else} \end{cases}$$

with f: R×P (S)→R and f(r, T) ∈[0, 1]; and g: R×S→R and g (r, t) ∈[0, 1], where R represents the space of all regular expressions, containing the regular expression r of a short form, and P(S) represents the power set over the set "S" of all strings containing the group of texts T.

The lower the ambiguity, the better. A perfect value of "0" occurs when the short form of the text string fits only one of the original long forms of the text string. The worst possible score of 1 means that the short form could have been derived from any of the long forms of the text strings.

In the illustrated embodiment, the text quality measurement unit 566 further includes an entropy calculation unit 582. In one embodiment, the entropy calculation unit 582 can be configured to determine how much information is lost during the text reduction processing. When removing parts of text, information may be lost. This can be partly represented by the ambiguity measure; however, there is additional information lost because, in natural language, some words are more important than others.

To measure entropy, meaningfulness values for different segments of the text string is first calculated with the total meaningfulness of a given text string can be given a value of 1. Each character's contribution in the text string to the meaningfulness value is then calculated. Finally, a determination of how much meaning has been reduced by removing certain of the characters from the text string can be made by subtracting the combined meaningfulness value of the removed characters from the total meaningfulness value of 1.

Meaningfulness can be calculated by linguistic analysis techniques by applying algorithms such as PoS tagging, grammatical structure analysis, and morphological analysis to assign meaningfulness scores to text strings. In one embodiment, the meaningfulness of words can be distributed over their characters by summing up the meaningfulness scores and normalizing them in the interval [0, 1]. For example, the text string "Name of Person" contains three words (1) name, (2) of, and (3) person. PoS tagging could reveal that the words "name" and "person" are important nouns, while the preposition "of" is rather unimportant.

Further, grammatical structure analysis could reveal that the word "name" is more specific, and therefore more important than the word "person" in this context. As a result, "name" could be assigned a score of 5, "person" a score of 4, and "of" a score of 1, while whitespace scores 0. Normalizing the total meaningfulness of 5+4+1=9 to 1 means that "name" contributes 5/9=0.56, and each of its letters 0.56/4=0.14. Therefore removing three of these letters drops the meaningfulness score by 0.42 points or 42% of total meaning.

Morphological analysis could also be performed to improve upon this by enabling scoring differently within words. For example, the morphological analysis of the word "goes" could indicate that "go" is the stem of the word with high meaningfulness, while "es" is only a conjugation with low meaningfulness. As a result, removing characters from "go" would result in a higher entropy than in removing characters from "es".

In the illustrated embodiment of FIG. 6B, the text quality measurement unit 566 further includes a confusion calculation unit 583. In one embodiment, the confusion calculation unit 583 can be configured to determine how confusing a short form may be. While ambiguity measures how similar the resulting short forms are in relation to each other, confusion measures such things on a global scale. In one embodiment, confusion may be calculated by looking up all words and sequences of words in the short form in a dictionary of short forms. The more hits that are found, the higher the confusion may become. Although an end user may still be able to distinguish the short form of a text string from other text strings in the user interface, the end user may no longer be able to deduce its meaning. For example, shortening "Street" to "St." may be unambiguous within the text group {Name, Country, Street}, but the short form "St." has many other connotations in a global context, such as "Saint" or "Stone" as examples.

The text quality measurement unit 566 further includes a style deviation calculation unit 584. In one embodiment, the style deviation calculation unit 584 can be configured to calculate how much the style changes as a result of text reduction operations, or whether something offensive was accidentally generated. Style deviation can be calculated by means of a dictionary that annotates each word with one or more styles. For example, the word "please" could be annotated as polite and formal, and the word "kill" could be annotated as colloquial (not literal). Existing dictionaries already partly do this with remarks like [coll.] that indicate that the word is used in colloquial language. Some of these remarks, such as [bot.] or [med.], have a different intention, but can also be interpreted as a hint at style, for example formal language.

Looking up all words and sequences of words from the original text in this dictionary can yield a collection of style tags. The number of occurrences can be taken as indicator of the predominant style, such as formal, or the mix of styles, such as formal and polite. Doing the same for the short form can generate a second collection of style tags. For example, the abbreviation "ass." may be treated as the regular word "ass" to determine that it should be annotated as impolite. Comparing the two can indicate whether the style changed. The number of difference can also be quantized to make this measurement in a numeric form.

For example, all words in the original text "Please switch off the lights" can be annotated as formal, while the word "please" can also be tagged as polite. In an example short form "switch off lights", all words are annotated as formal, but none are annotated as polite. As a result, the overall style of the text changed from formal and polite to formal when the short form was used. A numeric representation could be 0.5 because half of the style tags changed, for example.

The quality measurement unit 566 can produce one or multiple quality measurements of the short forms of a text string to be converted. The quality measurements of the short forms can then be compared, and the short forms with the best quality measurements can be selected as the best ones from the list of all possible short forms of a text string. The quality measurements may be directly incorporated into a simple standalone application that can be used by designers, writers, translators, and/or developers or other users of the STTS system.

In its simplest form, the application can provide two input fields, one for the original text string, and one for the short form that the user of the system suggests. The application can then compute quality measurements for the two alternatives and display them to the system user. The user of the STTS system may be able to use this information to identify unexpected outcomes, such as a confusion measure, for example. By repeatedly entering other short forms, users can improve through trial and error.

In a more advanced form, the application can provide additional input fields that allow entering the text strings that form the context of the original text. This can enable the application to compute other quality measures such as ambiguity.

In at least certain embodiments, context may be important to improve precision. Consider for example a table with two column labels "Source Node ID" and "Target Node ID". Here, the shortenings "Source" and "Target" are the best choices. Now consider a different UI where "Source Node ID" is a column label just to the left of the column labeled "Source Node Type". In this case, shortening both texts to "Source" would make them indistinguishable. Good text reductions for this example could be "ID" and "Type".

As another example: on a screen with the text strings "Create Sales Order", "Change Sales Order", and "Delete Sales Order", the verbs are the more important part. The nouns may therefore be abbreviated instead of the verbs. However, on another screen with the text strings "Create Sales Order", "Create Purchase Order", and "Create Invoice", the nouns are the distinguishing part and should be maintained in full, while the verbs could be shortened.

FIGS. 7A-7H depict an example embodiment of a process for using a collaborative workspace in a graphical user interface for intelligent text reduction during designing of the user interface display (i.e., at design time). As discussed above with respect to FIG. 2, the text tools workspace component 203A and collaboration component 203B can be used to facilitate developing user interfaces in a collaborative environment. The text tools workspace in the design time user interface 700 may involve a semi-automatic text analysis and translation process to arrive at a list of possible shortened UI text strings, as well as the best ones from the list. In one embodiment, the text tools workspace can incorporate grammar, spelling, text reduction, and smart dictionary and/or thesaurus functionality. One advantage of using the text tools workspace in the design time user interface 700 is that abbreviations and shortening text strings may require approval from a manager in an organization (e.g., a knowledge manager, project manager, usability expert or customer, etc.) and the design time user interface can be used by a system user to accomplish this.

Figure 7A:
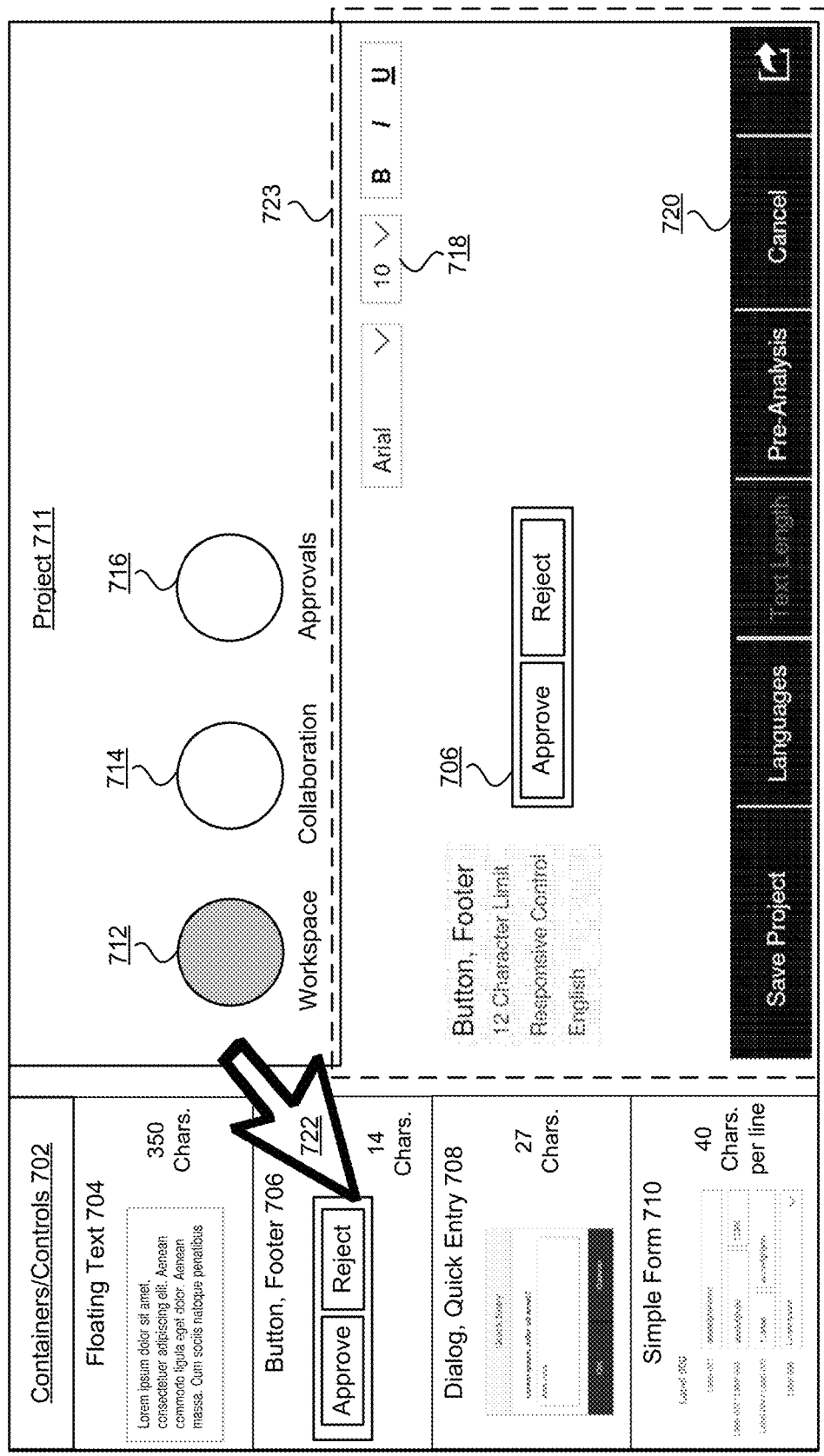

In FIG. 7A, at least certain of the features of the design time user interface 700 are displayed. In the illustrated embodiment, the design time user interface 700 includes a display area or region on the left-hand-side of the user interface 700 that may be presented to users for selecting containers and/or controls 702. In one embodiment, this display area for selecting containers and controls 702 may be implemented as a scrollable list on the left-hand-side of the user interface 700 with a scroll bar (not shown) for users to scroll up and down to access items from the list in the display. In other embodiments, the scrollable list 702 may be presented on the right-hand-side of the user interface 700, or in another suitable location.

In the depicted embodiment, the scrollable list 702 of containers/controls includes floating text 704, footer button 706, quick entry dialog 708, and simple form 710 and other containers and controls, etc., each of which may be accessed via scrolling through the list. In this case, the containers/controls 702 can each be associated with a maximum number of characters that can be entered into the container/control 702 display elements. For example, in this embodiment, the floating text box 704 has space for up to 350 characters, the footer button 706 has space for up to 14 characters, the quick-entry dialog box 708 has space for up to 27 characters, and the simple form 710 has space for up to 40 characters.

The design time user interface 700 further includes a display area for displaying a project on the right-hand-side of the interface. The project 711 in the depicted embodiment includes a workspace selection button 712 for selecting a workspace for the project, a collaboration selection button 714 for selecting from one or more collaborations for the project, and an approvals selection button 716 for retrieving one or more approvals received for aspects of the project. In this example, the workspace selection button 712 has been selected to display a workspace display area 723 for project 711.

The workspace display area 723 includes a phased modal text tools selection bar 720 with multiple buttons displayed for selecting among the various different phased modal text tool selections corresponding to the smart text reduction process at design time. In this case, the user has selected the footer button 706 from the containers/controls list 702 using a selection mechanism 722, which in this example is represented as a mouse pointer. Other selection mechanisms including a touch-screen display selection mechanism are possible. Developers and/or designers can use the workspace area 723 of the design time user interface 700 to work on projects such as revising the text displayed in the footer button 706. The workspace display area 723 also includes a set of font editing tools 718.

In response to the user selection, the selected footer button 706 can be presented in the workspace display area 723 of the design time user interface 700 as shown. In addition, information about the selected footer button 706 can be displayed in proximity to the selected element. In this example, the information includes the 12 character limit, responsive control, and language (English) of the text string in the selected graphical element.

Figure 7B:
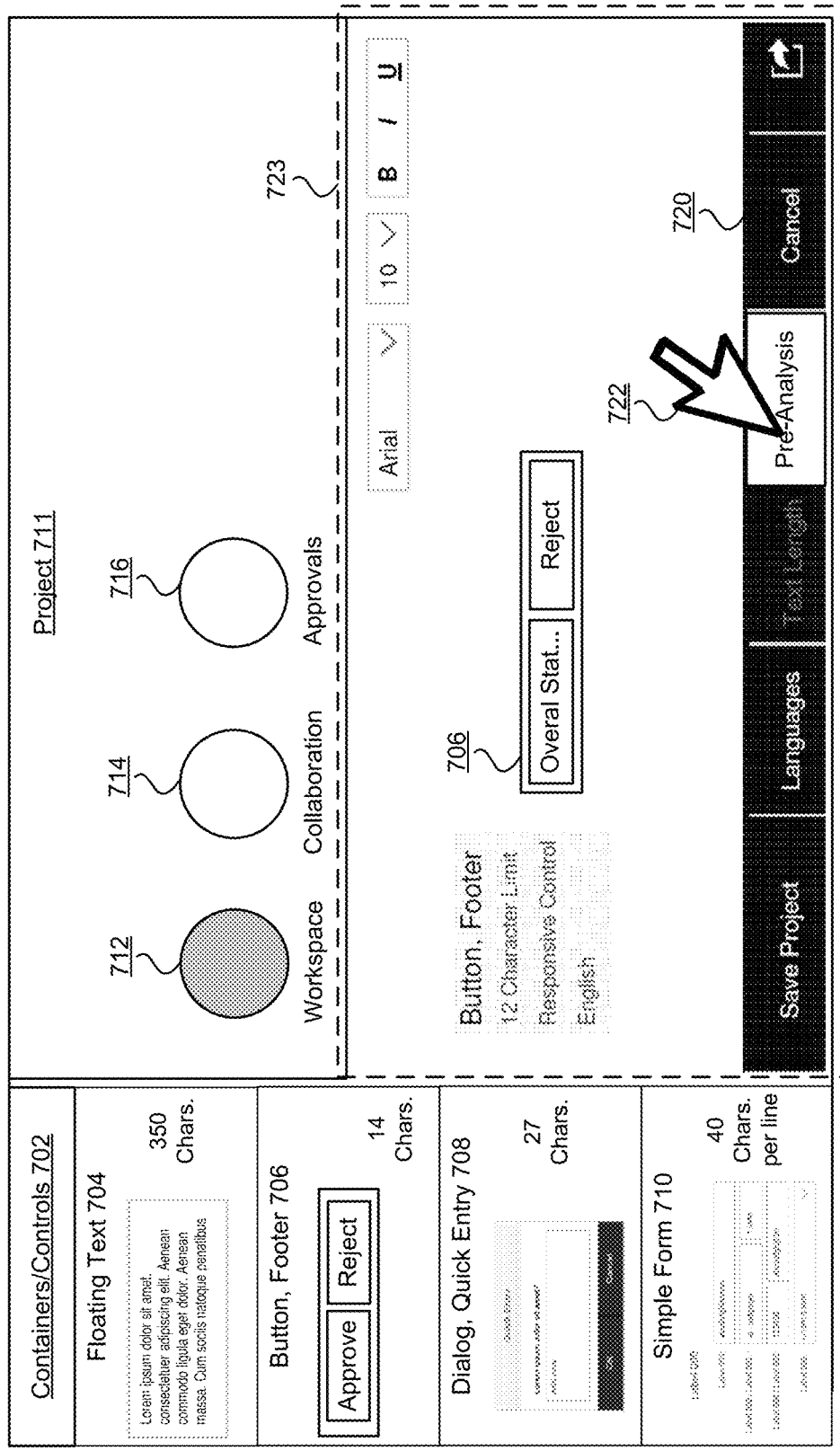

In FIG. 7B, a user has edited the footer button 706 to include the text "Overal Status" in the display element that previously included a text string "Approve." As in this case, the text edit is an erroneous one. Accordingly, the input text string "Overal" may be shown by an underline or other visible indicator (not shown) to be problematic. The user can then select the pre-analysis button on the phased modal text tools selection bar 720 using device pointer 722. In an embodiment, user interface selections by a system user within the design time user interface 700 may also be done via finger tapping on a mobile or other touch enabled display screens.

Figure 7C:
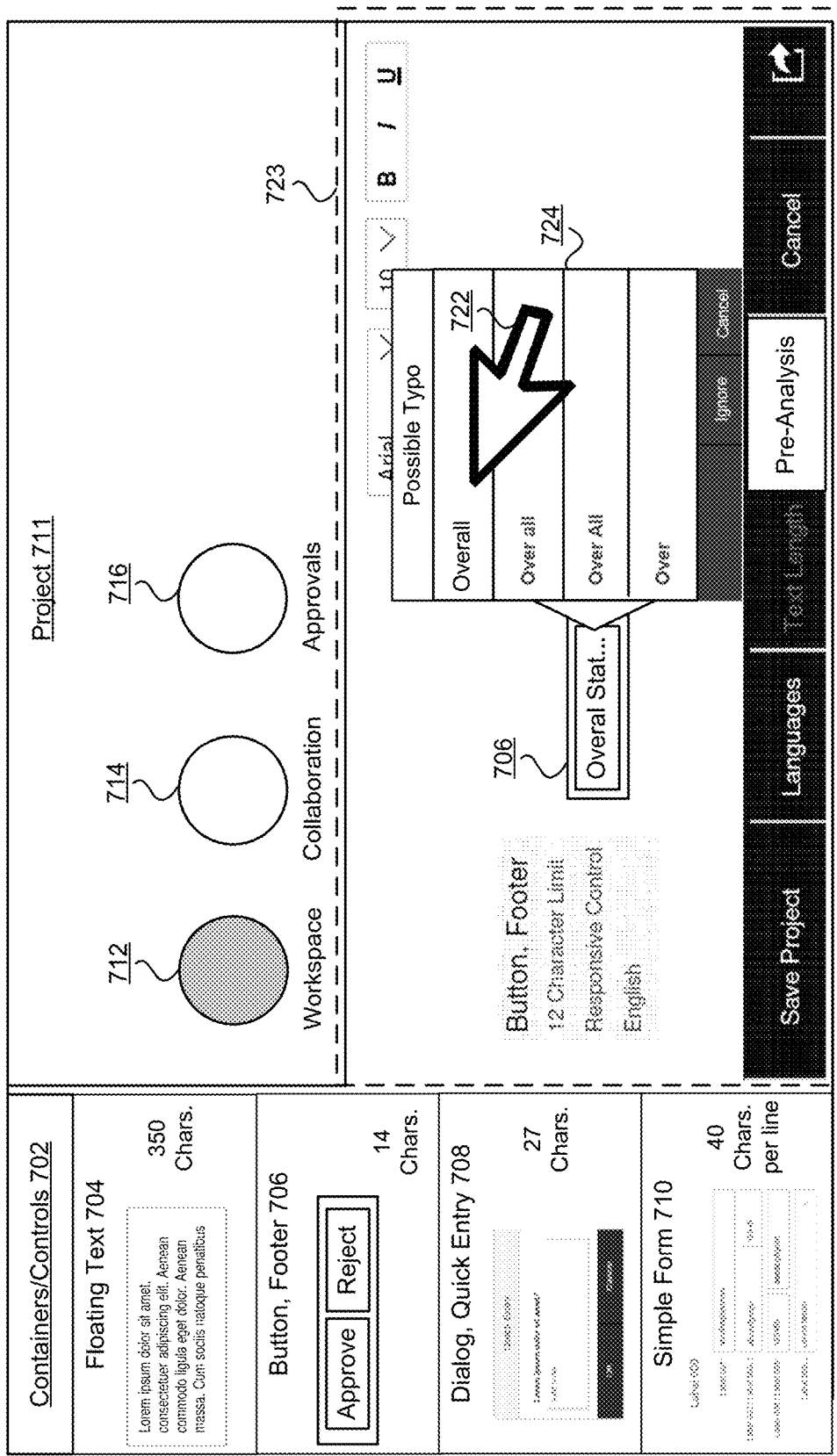

In response to this, as shown in FIG. 7C, a spell check can be automatically identified and performed on the misspelled word "Overal" in the footer button element 706. Subsequently a list of alternative spellings 724 can then be displayed in the workspace display 723 for the user to select using selection pointer 722. It should be noted, that in the depicted embodiment, the "text length" phase button is grayed out (disabled) and is not accessible until the pre-analysis and corresponding system user selections of alternative remedies have been performed or selected as "ignored" on all indicated problematic text strings displayed in the workspace area of the user interface 700.

Figure 7D:
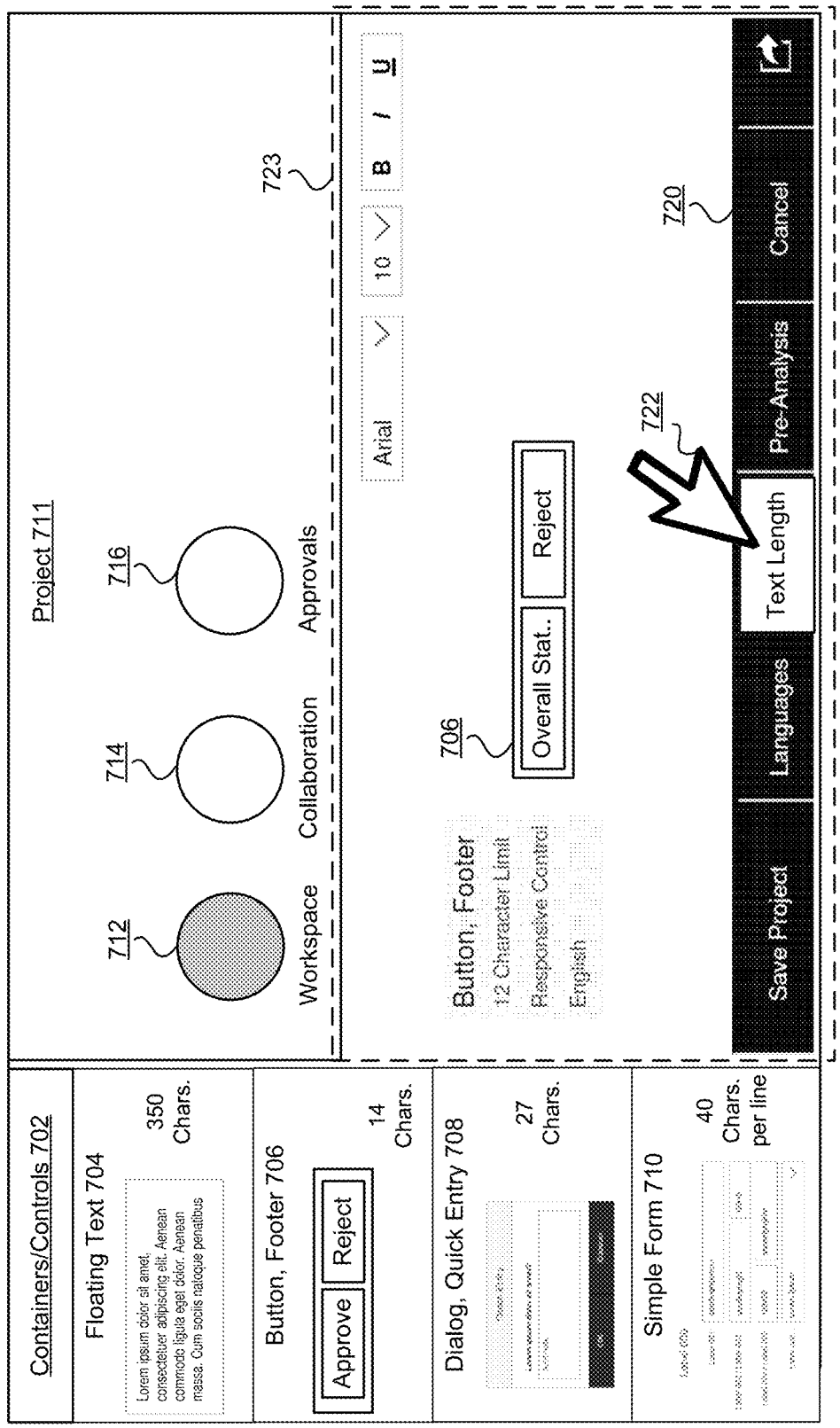
Figure 7E:
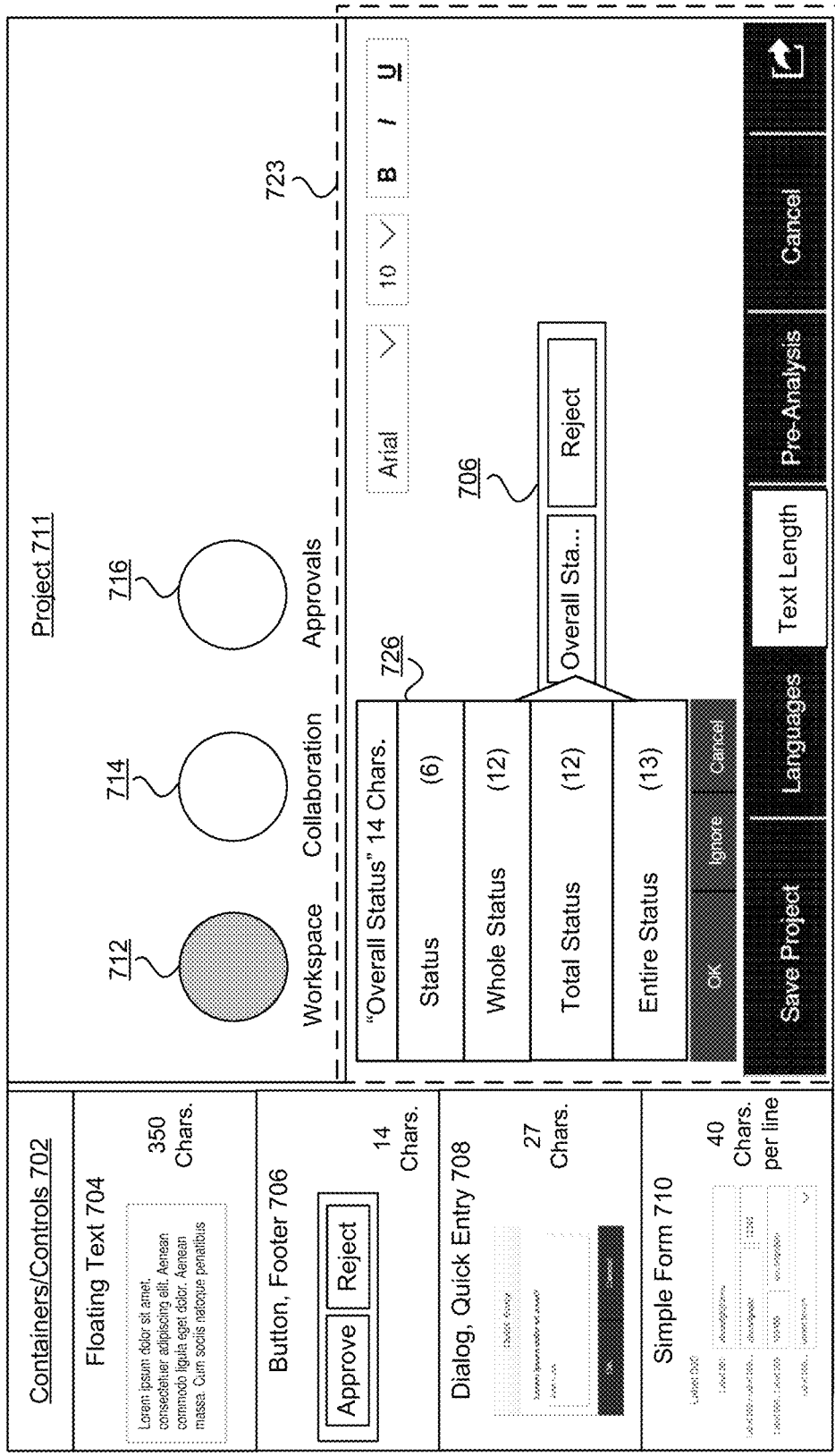

In FIG. 7D, the user has corrected the spelling of the text in the footer button element 706. In this case, the full text "Overall Status" could not be displayed, so a truncated text string "Overall Sta . . . " is displayed instead, indicating to the system user that the text string will not fit within the display area of footer button 706. The developer/designer can then select the "text length" phase selection button on the text tools selection bar 720 using the pointer 722. In one embodiment, the smart text reduction algorithm can be executed to perform one or more text reduction processes (as discussed above) on the text strings displayed in the workspace of the user interface 700 in response to selection of "text length" as shown in FIG. 7E, which depicts the resulting presentation of a list of possible short forms 726 based on executing the text reduction algorithm.

In the depicted embodiment, the list of possible short forms 726 includes the text of the possible short forms as well as the number of characters required to fully display it in the footer button 706. In this case, the possible short forms listed in list 726 for the text string "Overall Sta . . . " displayed in the footer button display element 706 includes the text string "Status" (6 characters), the text string "Whole Status" (12 characters), the text string "Total Status" (12 characters), and the text string "Entire Status" (13 characters). The user can then select one of the short form options. In this case, the user selects the text string "Total Status" option as the short form for the text string "Overall Sta . . . ," which is displayed in the footer button 706 as shown in FIG. 7F.

Figure 7G:
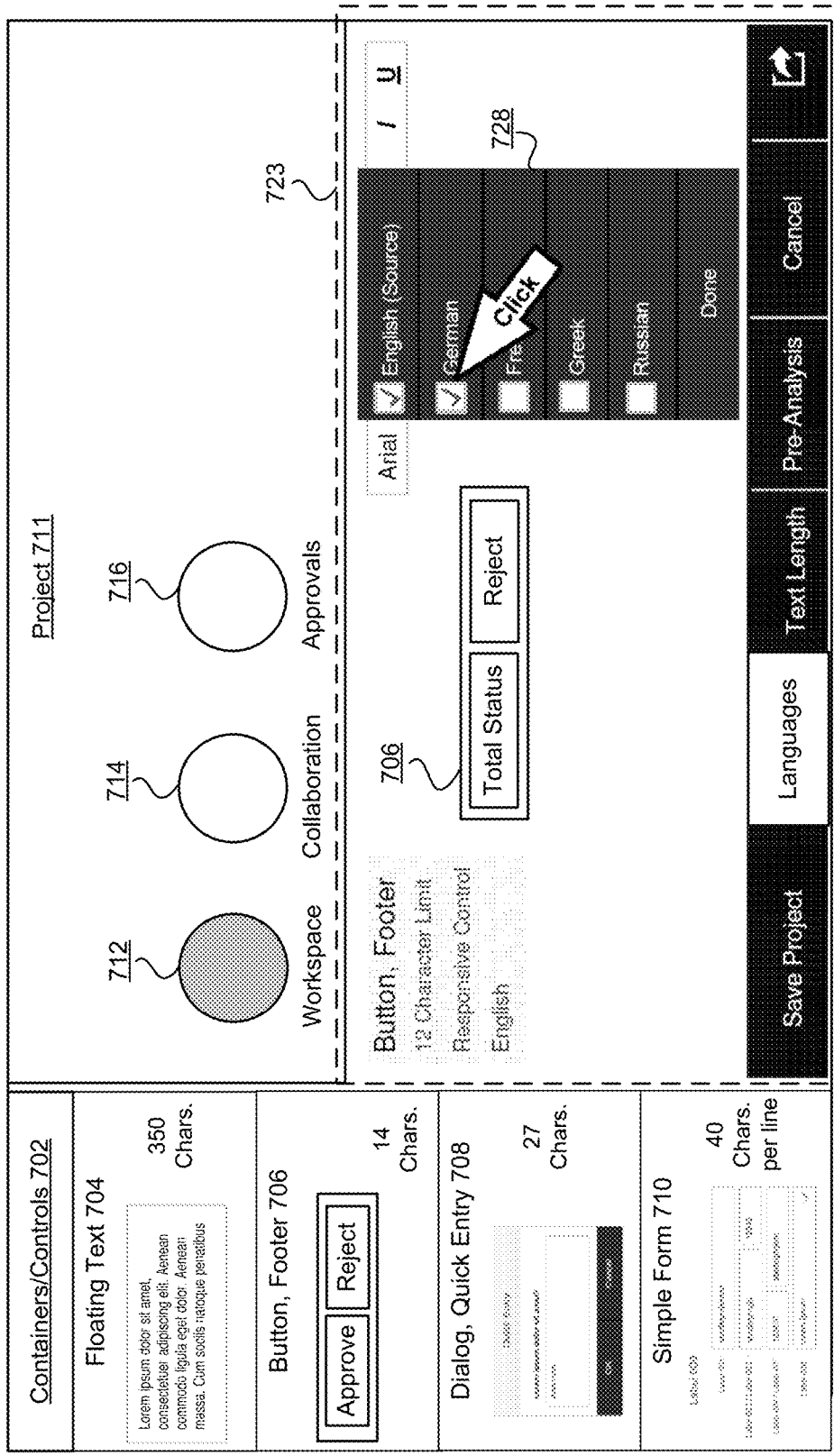

In FIG. 7F, the user can then select the "Languages" phase button from the phased text tools selection bar 720 to add additional language translations. In one embodiment, this can display a list of languages 728 for users to select from for translation of the text string in footer button 706 as shown in FIG. 7G, where, in this case, the user selects the English and German languages from the list of languages 728.

Figure 7H:
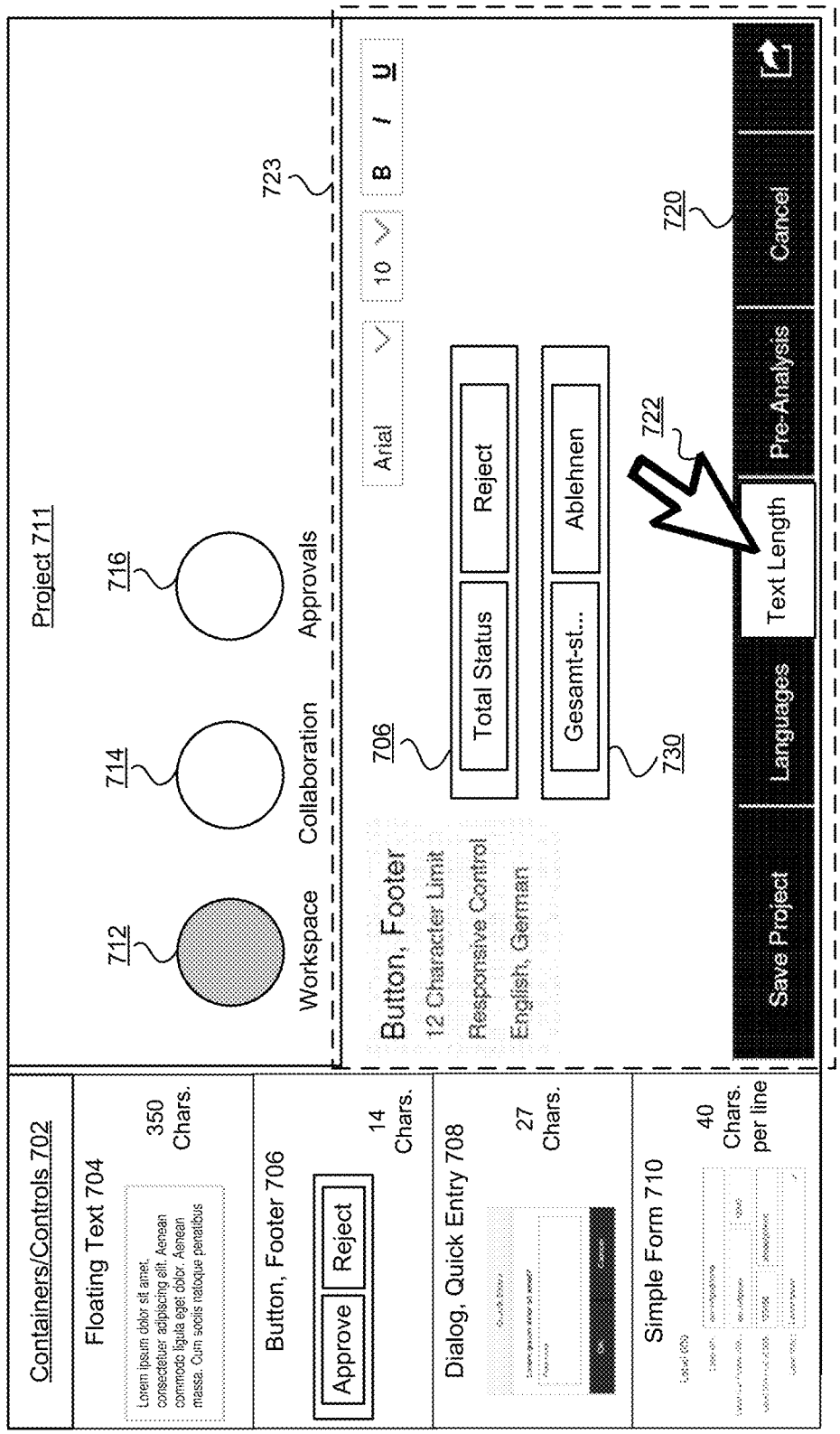

In FIG. 7H the corresponding German translation 730 of the footer button 706 is presented in the workspace display area 723 of the design time user interface 700. The user can then select the "Text Length" button again from the phased text tools selection bar 720 to execute the smart text reduction algorithm on the German text string, and the process repeats.

The collaboration workspace in at least certain embodiments provides an integrated "submit and approval" process to improve the quality of the smart text reduction algorithm. This can be a built-in process and can significantly reduce the risk of rejections and subsequent delays in finalizing a graphical design and implementation. It can also eliminate the need for multiple "non-form" inefficient email communications between users. And it can also provide an approval confirmation record for all collaborating users, which can avoid the redundancy of having to resubmit the same STTS options repeatedly.

At least certain embodiments of the design time user interface for smart text translation and shortening collaboration are operable to provide a simple and user-friendly "submit" control and user interface that displays the variants being submitted with corresponding user preferred rankings. The recipient information can also be communicated within the design time user interface. For example, the recipient information can be provided for a knowledge management responsible manager, and then a single one-click can submit the design to the recipient (e.g., manager) to initiate the approval process. The recipient can then receive a system notification and a form for approving request that may allow the manager recipient to approve the design and also to provide comments, etc. For example, the recipient manager can adjust the preferred rankings, add comments, indicate the design is approved (or not approved) or approve variant options, etc. And then a single one-click can return the form with approvals and comments to the originating user.

A simple selection of the approved variant can then automatically deploy the option in the design time user interface 700, as well as send a confirmation to the manager with a screen capture. All of this collaboration can be accomplished in the design time user interface without relying on email communications. This is advantageous for a number of reasons relating to allowing project collaboration within a dedicated area on both the sender and recipient sides; and without cluttering the users' email inbox unnecessarily.

Figure 8A:
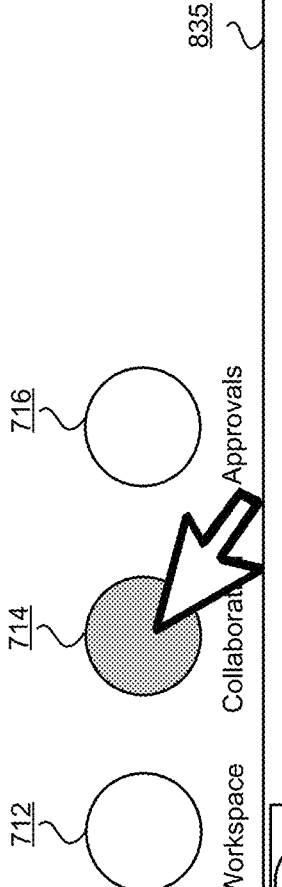
FIGS. 8A-8C depict example embodiments for the collaboration process in the design time user interface.
Figure 8B:
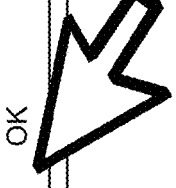
Figure 8C:
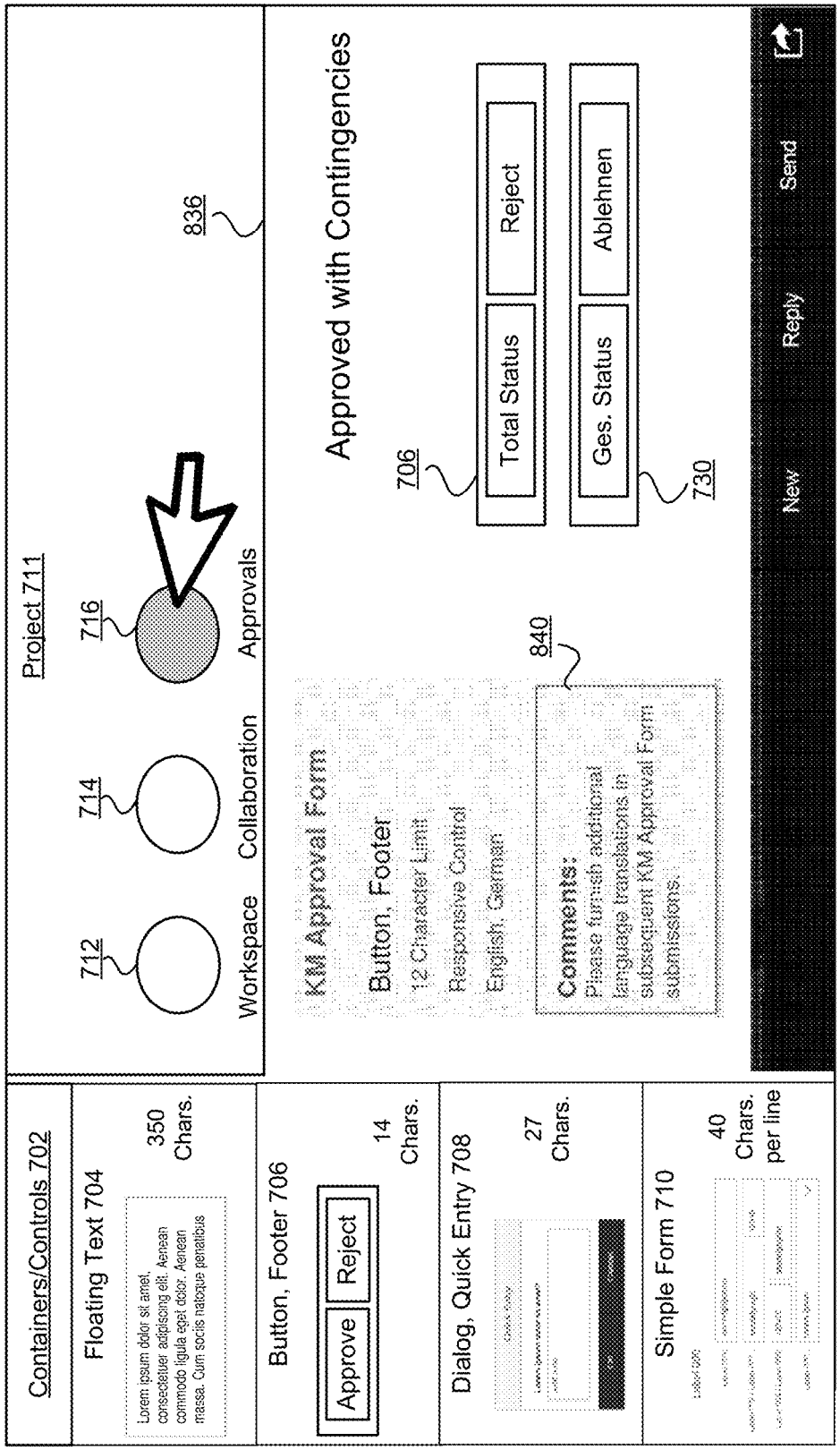

FIGS. 8A-8C depict example embodiments for the collaboration process in the design time user interface. In the embodiment depicted in FIG. 8A, the user has selected the collaboration selection button 714 for project 711. In this case, messages between users collaborating on project 711 can be displayed in display area 835. Electronic messages between users collaborating on a project can therefore be implemented in the design time user interface 800 as shown. Once a part of the project is complete and ready for approval, the developer or designer can activate a submission process. FIG. 8B shows a pop-up menu 838 that can be displayed to facilitate the approval process. The user can submit a particular project for review and can select features and live documents to send to the reviewer. In this case, the user can select a workspace screen capture (e.g., as a PDF file) of the project to be approved and can select a live approval form to be attached to the user's message in the approval submission process. FIG. 8C depicts the user selecting the approvals selection button 716 in the workspace display area for project 711. In response, the design time user interface 800 can display an approval form as well as other important information relating thereto, such as comments from the approver or indications of the status of the approval (e.g., approved with contingencies).

In at least certain embodiments, the automatic service embodiment implements a two-phase service: (1) linguistic pre-analysis and (2) executes a smart text shortening algorithm making use of the linguistic pre-analysis. The linguistic pre-analysis may use morphological analysis, part of speech tagging, and shallow parsing to annotate the parts of the texts with morphological information, part of speech information (word forms like noun, verb, adjective . . . ), and information obtained from shallow parsing.

The information from the linguistic pre-analysis can then be used to determine the semantic heads and dependents of text strings, and subsequently which parts of the text can be shortened or even left out without jeopardizing the meaning of the text string. The algorithm can calculate a list of the best possible short forms for a text string based on the amount of space available.

In at least certain embodiments, the smart text shortening algorithm can be language-dependent, i.e., it behaves differently for different languages/language groups, for example, including East-Slavic languages (Ukranian, Belarussian, Russian), Germanic languages (German, Dutch, Danish, Swedish, Norwegian), and Romanic languages (Italian, Spanish, French), etc. One reason is because languages/language groups may differ greatly with respect to word order and the degree of inflection.

In at least certain embodiments, the smart text reduction algorithm may be dependent on the types of the parts of the text. Some text types should not be shortened at all, such as for example, numbers, proper names, etc. In other embodiments, the algorithm may not shorten parts of the UI text strings with character lengths below a certain number of characters (e.g., 3).

The UI framework can also be configured to call the STTS service to check whether a text can be shortened to a specified size without jeopardizing its meaning at all. If not, the STTS service can return a minimum size recommendation. The UI framework can use this information to adapt its UI resizing.

II. Illustrative Processes

The following figures depict example flow charts illustrating various embodiments of a process for executing a smart text shortening algorithm to perform one or more text reduction processes on a text string in accordance with the techniques described in this disclosure. It is noted that the processes described below are exemplary in nature and are provided for illustrative purposes and not intended to limit the scope of the disclosure to any particular example embodiment. For instance, processes in accordance with some described embodiments may include or omit some or all of the operations described below, or may include operations in a different order than described. The particular operations described below are not intended to be limited to any particular set of operations exclusive of all other potentially intermediate operations.

In addition, the operations may be embodied in computer-executable code, which when executed may cause a general-purpose or special-purpose computer to perform certain functional operations. In other instances, these operations may be performed by specific hardware components or hardwired circuitry, or by any combination of programmed computer components and custom hardware circuitry.

Figure 9B:
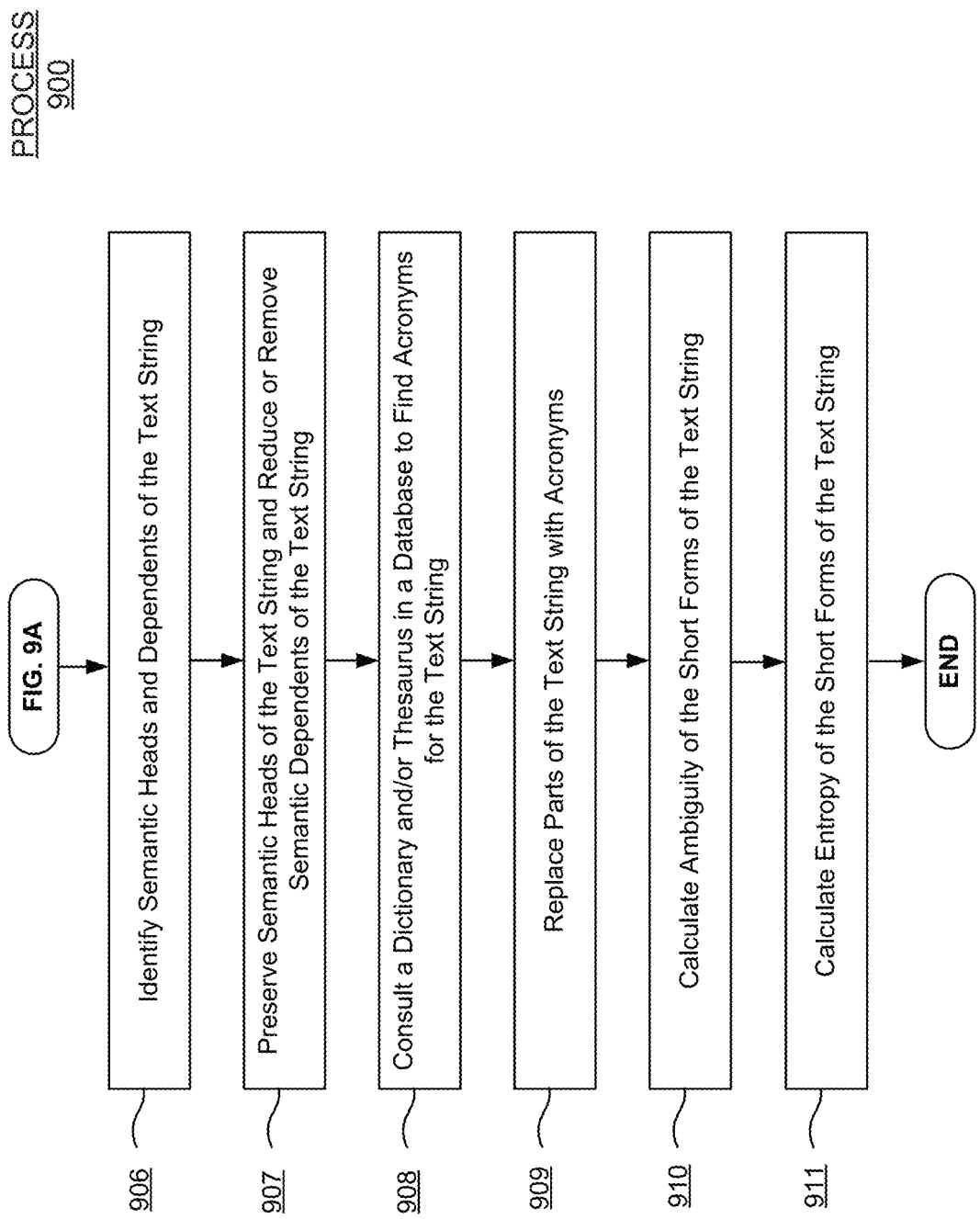
Figure 11:
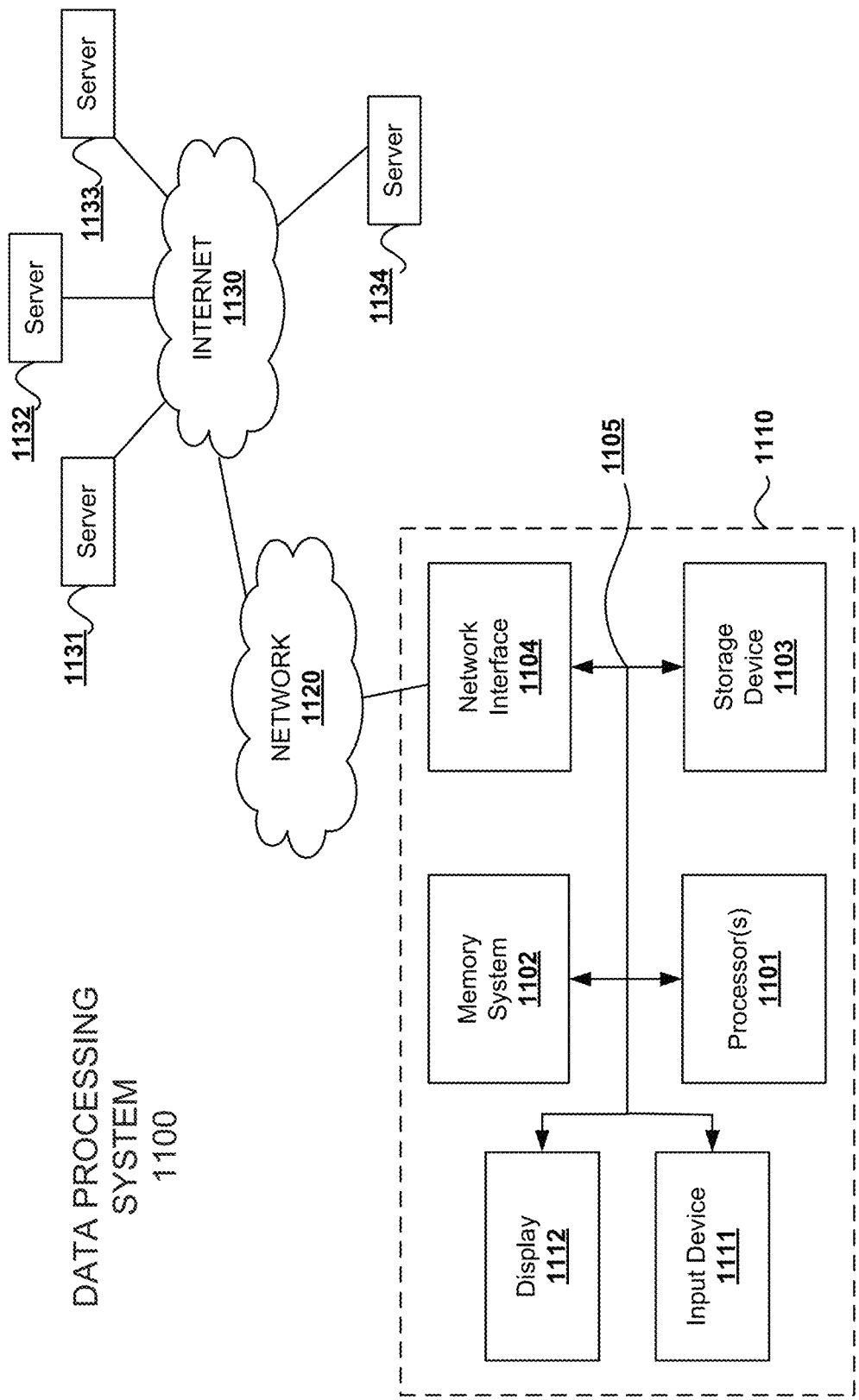

FIGS. 9A-9B depict flow charts of an example embodiment of a process for intelligently shortening text strings in a display element of a user interface. In the illustrated embodiment of FIG. 9A, process 900 begins by receiving inputs from an application or framework that implements the user interface when at least one text string is too long to be displayed in a display element of the user interface (operation 901). In one embodiment, the inputs may include the text string, an indication of the language of the text string, and the amount of available space for rendering the text string in the display element of the user interface.

Process 900 continues by executing a smart text reduction algorithm on the text string (operation 902) and identifying one or more short forms of the text string that fit within the available space of the display element based on executing the smart text reduction algorithm (operation 903). At operation 904, a list of the identified short forms of the text string that fit within the display element may optionally be compiled and displayed. The identified short forms of the text string may be communicated back to the requesting application or framework for display in the display element of the user interface.

In one embodiment, the text string to be rendered in the display element of the user interface may have been translated into a different language and the smart text reduction algorithm may have been executed on the translated text string to identify one or more short forms of the translated text string that fit within the available space of the display element.

Process 900 continues to FIG. 9B, which depicts certain of the details of the text reduction processes be performed on the text string in response to the execution of the smart text shortening algorithm. In the depicted embodiment, process 900 continues by identifying semantic heads and dependents of the text string (operation 906) and uses this information to preserve the semantic heads. The semantic dependents may then be reduced using the smart text reduction techniques described in this disclosure or removed all together from the text string (operation 907). In one embodiment, the semantic heads and dependents of the text string can be identified by performing morphological analysis, grammatical structure analysis, and parts-of-speech tagging to break the text string into its semantic heads and dependents.

Process 900 continues by consulting a dictionary and/or thesaurus in a database to identify a list of one or more acronyms for the text string (operation 908), and replacing at least parts of the text string with one or more of the identified acronyms (operation 909). Ambiguity of the short forms of the text string can then be calculated (operation 910). The entropy of the short forms of the text string can also be calculated (operation 911). This completes process 900 according to one example embodiment using the techniques described in this disclosure.

FIGS. 10A-10B depict flow charts of an example embodiment of a process for intelligent text reduction in a design time user interface with collaboration functionality. In the illustrated embodiment of FIG. 10A, process 1000 begins at operation 1001 by receiving an input modifying at least one display element presented in the user interface. Process 1000 can then determine whether any of the text strings in the modified display element are too long to be displayed in an amount of available space in the modified display element (operation 1002); and if so, a smart text reduction algorithm can be executed on the text string to identify one or more short forms of the text string that fit within the available space of the display element of the user interface (operation 1003).

Process 1000 continues by presenting a list of the short forms of the text string in the user interface for selection by a user (operation 1004). Users can then provide input selecting one of the displayed short forms the text string from the list of short forms (operation 1005), and the selected short form of the text string can be displayed in the modified display element in the user interface (operation 1006).

Process 1000 continues at FIG. 10B, which depicts additional operations and features of the design time user interface collaboration functionality. Process 1000 continues by receiving a request for approval of the modified display element displaying the selected short form of the text string (operation 1007). In one embodiment, the request for approval is submitted directly through the functionality of the design time user interface. An indication of the approval of the modified display element can then be received at the user interface in response to the request (operations 1008), and the approved display element and corresponding short form of the text string can be stored as an entry in a database (operation 1009). In one embodiment, the entries in the database increase over time as additional short forms of approved display elements are stored in the database. These entries can be later accessed for approval of other similarly configured text strings for various UI display elements by users of the system.

Process 1000 continues by receiving a subsequent request for approval of a second modified display element (operation 1010). The attributes of the second modified display element can then be compared with attributes of approved display elements stored in the database (operation 1011), and the second modified display element can be approved when the attributes of the second modified display element match attributes of an approved display element stored in the database (operation 1012). Using this process, subsequent approvals may be generated automatically upon submission without requiring contacting an approving manager. In one embodiment, the submit and approval process can be integrated with the smart text reduction processes via the user interface without using email communications. The attributes of the modified display element may include, for example, one or more of the color, x/y coordinates, and/or abbreviations used in the short form of the text string.

In other embodiments, a pre-analysis can be performed on the modified display element to identify grammatical and spelling errors in the text string before the smart text reduction algorithm is executed on the text string. This completes process 1000 according to one example embodiment.

III. Illustrative Computer Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 11:
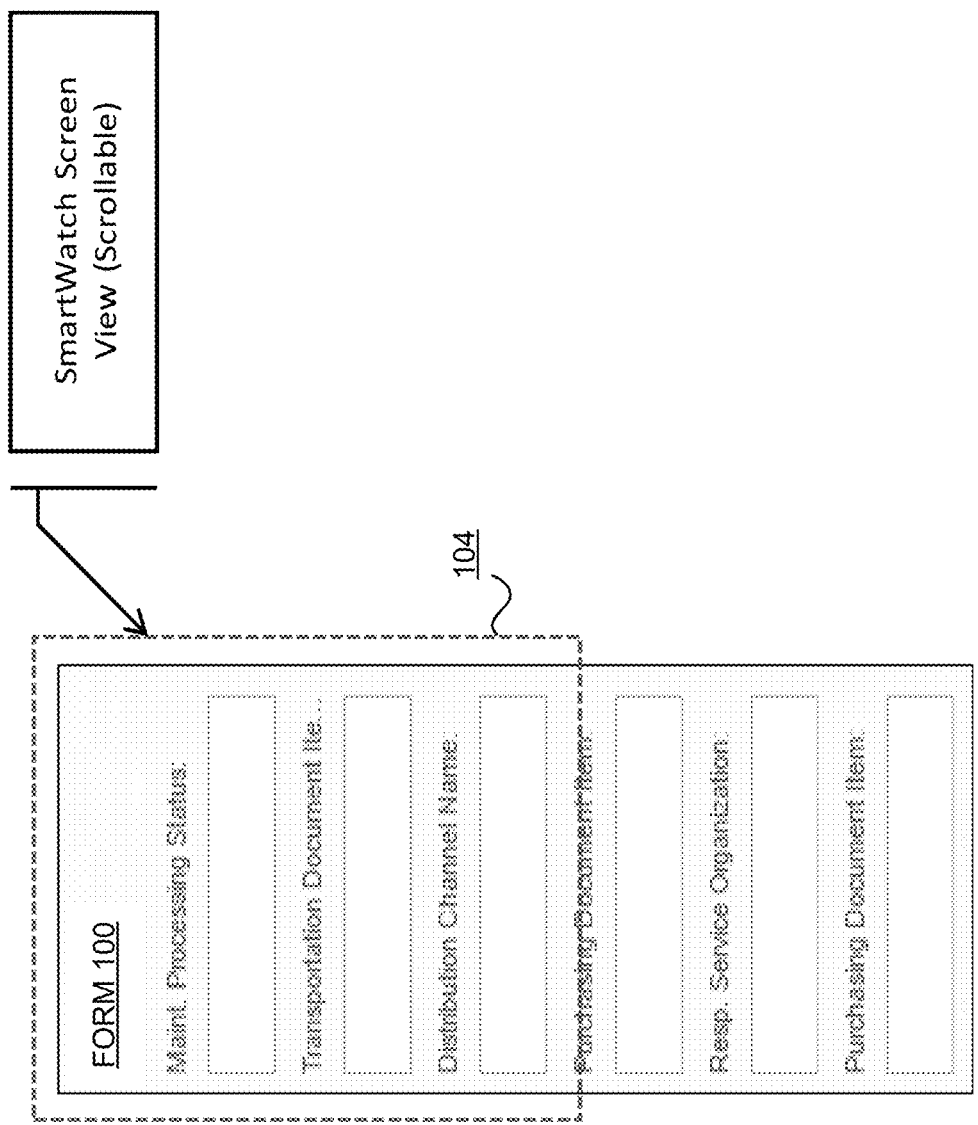
FIG. 11 depicts an example overview block diagram of a data processing system upon which the embodiments described in this disclosure may be implemented.

FIG. 11 depicts an example overview block diagram of a data processing system upon which the embodiments described in this disclosure may be implemented. It is to be understood that a variety of computers configurations may be used to implement the described techniques. While FIG. 11 illustrates various components of a data processing system 1100, it is not intended to represent any particular architecture or manner of interconnecting components. It will also be appreciated that network computers and other data processing systems, which have fewer components or additional components, may be used. The data processing system 1100 may, for example, comprise a personal computer ("PC"), workstation, laptop computer, tablet, smartphone or other hand-held wireless device, or any device having similar functionality.

In the illustrated embodiment, data processing system 1100 includes a computer system 1110. Computer system 1110 includes an interconnect bus 1105 (or other communication mechanism for communicating information) and one or more processor(s) 1101 coupled with the interconnect bus 1105 for processing information. Computer system 1110 also includes a memory system 1102 coupled with the one or more processors 1101 via the interconnect bus 1105. Memory system 1102 is configured to store information and instructions to be executed by processor 1101, including information and instructions for performing the techniques described above. This memory system may also be used for storing programs executed by processor(s) 1101. Possible implementations of this memory system may be, but are not limited to, random access memory (RAM), read only memory (ROM), or combination thereof.

In the illustrated embodiment, a storage device 1103 is also provided for storing information and instructions. Typically storage device 1103 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 1103 may store source code, binary code, or software files for performing the techniques above. In addition, while FIG. 11 shows that storage device 1103 as a local device connected with the components of the data processing system, it will be appreciated by skilled artisans that the described techniques may use a storage device remote from the system, such as a database or other network storage device coupled with the computer system 1110 through a network interface such as network interface 1104.

Network interface 1104 may provide communications between computer system 1110 and a network 1120. The network interface 1104 may be a wireless or wired connection, or any combination thereof. Computer system 1110 is configured to send and receive information through the network interface 1104 across one or more networks 1120 such as a local area network (LAN), wide-area network (WAN), wireless or Bluetooth network, or the Internet 1130, etc. Computer system 1110 may access data and features on systems residing on one or multiple different hardware servers 1131-1134 across the network 1120. Hardware servers 1131-1134 and associated server software may also reside in a cloud computing environment.

Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Storage device 1103 and memory system 1102 are both examples of non-transitory computer readable storage media.

Computer-readable media can also be distributed over a network of interconnected computer systems and executed in a distributed manner. Operations can be performed by remote data processing devices communicating with one another over one or more wired or wireless networks comprising multiple interconnected nodes.

Further, computer system 1110 may be coupled via interconnect bus 1105 to a display 1112 for displaying information to a computer user. An input device 1111 such as a keyboard, touchscreen, and/or mouse is coupled to bus 1105 for communicating information and command selections from the user to processor 1101. The combination of these components allows the user to communicate with the system. In some systems, bus 1105 represents multiple specialized interconnect buses.

With these embodiments in mind, it will be apparent from this description that aspects of the described techniques may be embodied, at least in part, in computer software, hardware, firmware, or any combination thereof. The techniques may be carried out in a computer system or other data processing system in response executing sequences of instructions stored in memory.

Certain embodiments are described in this disclosure as including logic or a number of components, modules, or mechanisms. Modules may constitute either software modules (e.g., code embodied on a machine-readable medium) or hardware modules, or combination thereof. A "hardware module" may be a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described in this disclosure.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array ("FPGA") or an Application Specific Integrated Circuit ("ASIC"), Programmable Logic Device ("PLD"), etc. A hardware module may also include programmable logic or circuitry that is temporarily configured by software to perform certain operations. For example, a hardware module may include software executed by a general-purpose processor or other programmable processor. Once configured by such software, hardware modules may become specific machines (or specific components of a machine) tailored to perform one or more configured functions. It will be appreciated that the decision to implement a hardware module mechanically in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain of the operations described in this disclosure.

As used in this disclosure, "hardware-implemented module" may refer to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Similarly, the functions described in this disclosure may be at least partially processor-implemented, with a particular processor or processors being an example of hardware. For example, at least some of the operations of a function may be performed by one or more processors or processor-implemented modules. Moreover, the one or more processors may also operate to support performance of the relevant operations in a "cloud computing" environment or as a "software as a service" ("SaaS"). For example, at least some of the operations may be performed by a group of computers (as examples of machines including processors), with these operations being accessible via a network (e.g., the Internet) and via one or more appropriate interfaces (e.g., an API).

The performance of certain of the operations described in this disclosure may be distributed among one or more processors, not only residing within a single machine, but potentially deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, components, applications, and so forth, described in conjunction with other illustrations and diagrams in this disclosure may be implemented in some embodiments in the context of a machine and an associated software architecture. The sections below describe representative software architecture(s) and machine (e.g., hardware) architecture(s) that are suitable for use with the disclosed embodiments.

Software architectures may be used in conjunction with hardware architectures to create devices and machines for particular purposes. For example, a particular hardware architecture coupled with a particular software architecture can create a mobile device, such as a mobile phone, tablet device, and so forth. A slightly different hardware and software architecture may yield a smart device for use in the "Internet of Things ("IoT")", while yet another combination may produce a server computer for use within a cloud computing architecture. Not all combinations of such software and hardware architectures are presented here, as those of skill in the art can readily understand how to implement the inventive subject matter in different contexts from the disclosure contained in this disclosure.

Figure 12:
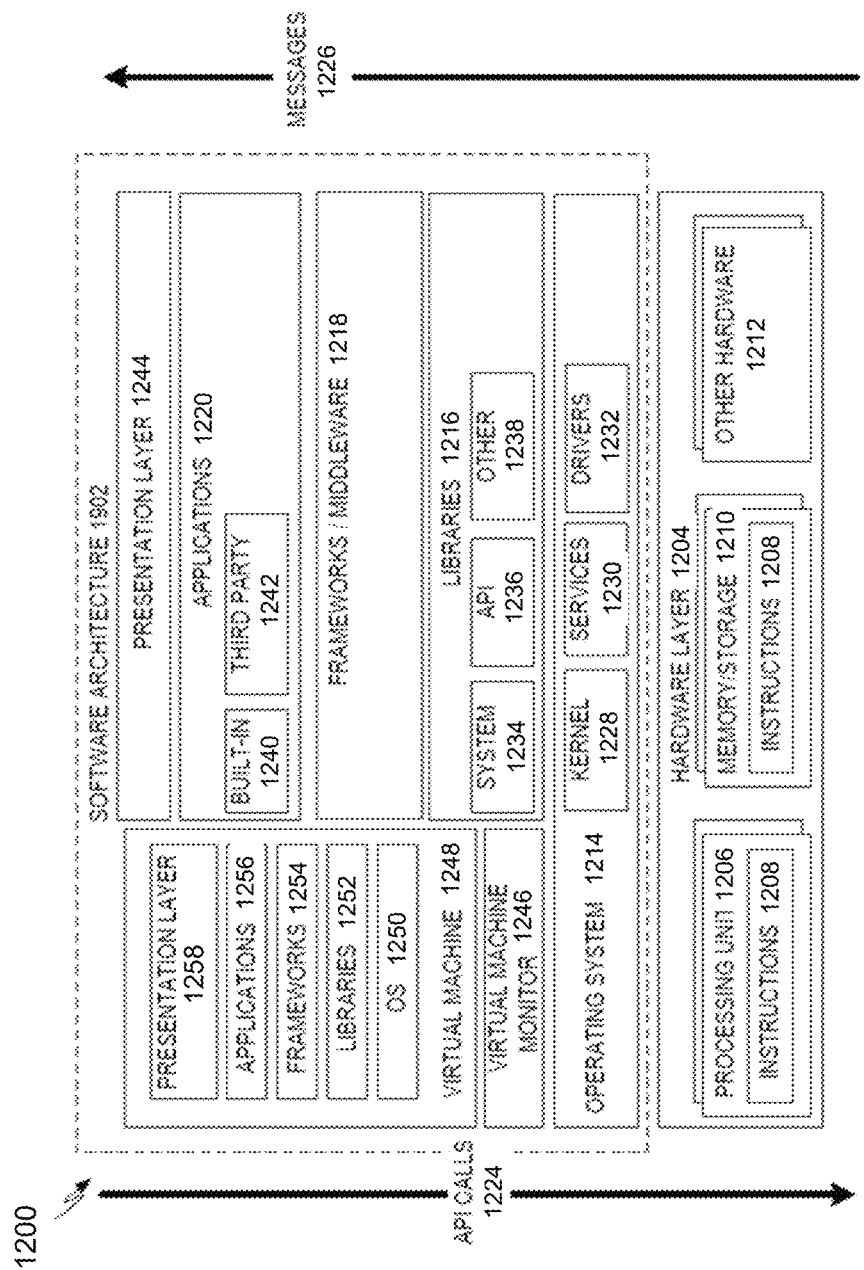
FIG. 12 depicts an example overview block diagram of a representative software architecture which may be used in conjunction with various hardware architectures described in this disclosure.

FIG. 12 depicts an example overview block diagram of a representative software architecture which may be used in conjunction with various hardware architectures described in this disclosure. FIG. 12 is merely a non-limiting example of a software architecture, and it will be appreciated that many other architectures may be implemented to facilitate the functionality described in this disclosure. The software architecture 1202 may be executing on hardware such as a machine 1110 of FIG. 11. A representative hardware layer 1204 is illustrated and can represent, for example, the machine 1110 of FIG. 11. The representative hardware layer 1204 may comprise one or more processing units 1206 having associated executable instructions 1208. The executable instructions 1208 represent the executable instructions of the software architecture 1202, including implementation of the methods, modules, and so forth in other invention illustration and diagrams. The hardware layer 1204 may also include memory and/or storage modules 1210, which have the executable instructions 1208. The hardware layer 1204 may also comprise other hardware 1212, which represents any other hardware of the hardware layer 1204, such as the other hardware illustrated as part of the machine 2000.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1244. Operationally, the applications 1220 and/or other components within the layers may invoke API calls 1224 through the software stack and receive responses, returned values, and so forth, illustrated as messages 1226, in response to the API calls 1224. The layers illustrated are representative in nature and not all software architectures have all layers. For example, some mobile or special purpose operating systems may not provide a layer of frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 may include built-in applications 1240 and/or third party applications 1242. Examples of representative built-in applications 1240 may include, but are not limited to, a contacts application, a browser application, a book reader application, a location application, a media application, a messaging application, and/or a game application. The third party applications 1242 may include any of the built-in applications 1240 as well as a broad assortment of other applications. In a specific example, the third party application 1242 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 1242 may invoke the API calls 1224 provided by the mobile operating system such as the operating system 1214 to facilitate functionality described in this disclosure.

The applications 1220 may utilize built-in operating system 1214 functions (e.g., kernel 1228, services 1230, and/or drivers 1232), libraries 1216 (e.g., system libraries 1234, API libraries 1236, and other libraries 1238), and frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures utilize virtual machines. In the example of FIG. 12, this is illustrated by a virtual machine 1248. A virtual machine may create a software environment where applications/modules can execute as if they were executing on a hardware machine (such as the machine 1110 of FIG. 11, for example). A virtual machine may be hosted by a host operating system (e.g., operating system 1214 in FIG. 12) and typically, although not always includes a virtual machine monitor 1246, which manages the operation of the virtual machine 1248 as well as the interface with the host operating system (e.g., operating system 1214). A software architecture may execute within the virtual machine 1248, such as an operating system 1250, libraries 1252, frameworks/middleware 1254, applications 1256, and/or a presentation layer 1258. These layers of software architecture executing within the virtual machine 1248 can be the same as corresponding layers previously described or may be different.

Throughout the foregoing description, for the purposes of explanation, numerous specific details were set forth in order to provide a thorough understanding of this disclosure. It will be apparent, however, to persons skilled in the art that embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the invention as defined by the claims.

APPENDIX A

The following is one example pseudo-code implementation of an embodiment of a smart text reduction service:

```
def sts(fullText: String, language: String, space: Float, context: Context) =
{
    // Get linguistic analysis
    var linguisticAnalysis = STTS.getLinguisticAnalysis(fullText,
    language)
    // Get terminological analysis
    var terminologicalAnalysis =
    STTS.getTerminologicalAnalysis(fullText, language)
    // Choose heuristic
    var chosenHeuristic = STTS.chooseHeuristic(linguisticAnalysis,
    terminologicalAnalysis, space, context)
    switch chosenHeuristic {
    // Example: Algorithm to keep linguistic heads (=more important
    words) and drop the dependents (less important words).
        case LINGUISTIC_KEEP_HEADS:
            var heads = linguisticAnalysis.getHeads( )
            var dependents = linguisticAnalysis.getDependents( )
            var shortenedText = fullText
            // Shorten the text until it fits into the given space.
            while (shortenedText.getSpace( ) > space)
            {
                var words = String.split(shortenedText, " ")
                // Keep only the heads (=drop the dependents).
                var keptWords = new List<String>( )
                for (val word in Words) {
                    if (heads.contain(word)) {
                        keptWords += word
                    }
                }
                val newShortenedText = String.join(keptWords, " ")
                // Check whether text could not be shortened anymore.
                if (newShortenedText.size( ) == shortenedText.size( )) {
                    // Notify the UI calling the Automatic STTS Service;
                    // alternatively, could try other heuristics first.
                    STTS.notifyUI("Shortening failed")
                    break;
                } else {
                    shortenedText = newShortenedText
                }
            }
        ...
    }
}
```

What is claimed is:

1. A method comprising:

at an application on a computer system configured for enabling users to design graphical interfaces, the computer system having at least one processor and a memory storing computer programs for execution by the processor, the method comprising:

receiving an input in a user interface modifying at least one display element presented in the user interface;

determining that a length of at least one text string in the modified display element exceeds an amount of available space in the modified display element;

executing a text reduction algorithm on the text string to identify one or more short forms of the text string that fit within the available space of the display element of the user interface;

measuring a quality of one of the short forms of the text string by calculating entropy, confusion, and style deviation;

presenting a list of the short forms of the text string in the user interface according to the quality for selection by a user;

receiving user input selecting a short form of the text string from the list of short forms; and displaying the selected short form of the text string in the modified display element in the user interface.

2. The method of claim 1 further comprising:

receiving, at the user interface, a request for approval of the modified display element displaying the selected short form of the text string;

receiving, at the user interface, an indication of an approval of the modified display element in response to the request; and storing the approved display element and corresponding short form of the text string as an entry in a database, wherein entries in the database increase over time as additional short forms of approved display elements are stored in the database.

3. The method of claim 2 further comprising:
receiving, at the user interface, a subsequent request for approval of a second modified display element;
comparing attributes of the second modified display element with attributes of approved display elements stored in the database; and
determining the second modified display element is approved when the attributes of the second modified display element match attributes of an approved display element stored in the database.

4. The method of claim 3 wherein the second display element is approved without receiving an additional approval for the second display element.

5. The method of claim 3 wherein the attributes of the modified display element include one or more of color, x/y coordinates, and abbreviations used in the selected short form of the text string.

6. The method of claim 1 further comprising:
receiving, at the user interface, an input selecting a language for the text string to be translated into;
translating the text string into the selected language;
determining the translated text string is too long to be displayed in the amount of available space in the display element of the user interface; and
executing the text reduction algorithm on the translated text string to identify one or more short forms of the translated text string that fit within the available space of the display element.

7. The method of claim 1 further comprising executing a pre-analysis on the modified display element to identify grammatical and spelling errors in the text string.

8. The method of claim 1 wherein characters required for displaying each short form of the text string in the list of short forms is displayed in the user interface with the short form of the text string.

9. The method of claim 1 wherein the application eliminates redundancy of repeatedly submitting selections of text reduction options.

10. The method of claim 1 wherein the application integrates a submit and approval process via the user interface without using email communications.

11. A computer system comprising:
at least one processor;
a communications medium coupled with the processor;
a memory in communication with the processor via the communication medium, the memory configured to store programmed computer code, which when executed by the processor, causes the processor to perform operations of an application configured for enabling users to design graphical user interfaces, the operations comprising:
receiving an input in a user interface modifying at least one display element presented in the user interface;
determining that a length of at least one text string in the modified display element exceeds an amount of available space in the modified display element;
executing a text reduction algorithm on the text string to identify one or more short forms of the text string that fit within the available space of the display element of the user interface;

measuring a quality of one of the short forms of the text string by calculating entropy, confusion, and style deviation;
presenting a list of the short forms of the text string in the user interface according to the quality for selection by a user;
receiving user input selecting a short form of the text string from the list of short forms; and
displaying the selected short form of the text string in the modified display element in the user interface.

12. The system of claim 11 wherein the operations further comprise:
receiving, at the user interface, a request for approval of the modified display element displaying the selected short form of the text string;
receiving, at the user interface, an indication of an approval of the modified display element in response to the request; and
storing the approved display element and corresponding short form of the text string as an entry in a database, wherein entries in the database increase over time as additional short forms of approved display elements are stored in the database.

13. The system of claim 12 wherein the operations further comprise:
receiving, at the user interface, a subsequent request for approval of a second modified display element;
comparing attributes of the second modified display element with attributes of approved display elements stored in the database; and
determining the second modified display element is approved when the attributes of the second modified display element match attributes of an approved display element stored in the database.

14. The system of claim 13 wherein the second display element is approved without receiving an additional approval for the second display element.

15. The system of claim 11 wherein the operations further comprise:
receiving, at the user interface, an input selecting a language for the text string to be translated into;
translating the text string into the selected language;
determining the translated text string is too long to be displayed in the amount of available space in the display element of the user interface; and
executing the text reduction algorithm on the translated text string to identify one or more short forms of the translated text string that fit within the available space of the display element.

16. The system of claim 11 wherein the operations further comprise executing a pre-analysis on the modified display element to identify grammatical and spelling errors in the text string.

17. A non-transitory computer readable storage medium storing programmed computer code, which when executed by a computer system having at least one processor and a memory storing computer programs for execution by the processor, causes the computer system to perform operations of an application configured for enabling users to design graphical user interfaces, the operations comprising:
receiving an input in a user interface modifying at least one display element presented in the user interface;
determining that a length of at least one text string in the modified display element exceeds an amount of available space in the modified display element;

executing a text reduction algorithm on the text string to identify one or more short forms of the text string that fit within the available space of the display element of the user interface;

measuring a quality of one of the short forms of the text string by calculating entropy, confusion, and style deviation;

presenting a list of the short forms of the text string in the user interface according to the quality for selection by a user;

receiving user input selecting a short form of the text string from the list of short forms; and displaying the selected short form of the text string in the modified display element in the user interface.

18. The computer readable storage medium of claim 17 wherein the operations further comprise:

receiving, at the user interface, a request for approval of the modified display element displaying the selected short form of the text string;

receiving, at the user interface, an indication of an approval of the modified display element in response to the request; and storing the approved display element and corresponding short form of the text string as an entry in a database, wherein entries in the database increase over time as additional short forms of approved display elements are stored in the database.

19. The computer readable storage medium of claim 18 wherein the operations further comprise:

receiving, at the user interface, a subsequent request for approval of a second modified display element;

comparing attributes of the second modified display element with attributes of approved display elements stored in the database; and determining the second modified display element is approved when the attributes of the second modified display element match attributes of an approved display element stored in the database.

20. The computer readable storage medium of claim 17 wherein the second display element is approved without receiving an additional approval for the second display element.

\* \* \* \* \*